(12) United States Patent
Min et al.

(10) Patent No.: US 12,062,317 B2
(45) Date of Patent: Aug. 13, 2024

(54) ELECTRONIC DEVICE, DISPLAY DEVICE CONNECTED TO ELECTRONIC DEVICE, AND OPERATING METHOD THEREOF

(71) Applicant: Samsung Electronics Co., Ltd., Suwon-si (KR)

(72) Inventors: Hyunkee Min, Suwon-si (KR); Doosuk Kang, Suwon-si (KR); Jihoon Sung, Suwon-si (KR); Sunkey Lee, Suwon-si (KR); Junghun Lee, Suwon-si (KR); Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 17/422,606

(22) PCT Filed: Jul. 9, 2021

(86) PCT No.: PCT/KR2021/008817
§ 371 (c)(1),
(2) Date: Jul. 13, 2021

(87) PCT Pub. No.: WO2022/014971
PCT Pub. Date: Jan. 20, 2022

(65) Prior Publication Data
US 2022/0343829 A1    Oct. 27, 2022

(30) Foreign Application Priority Data

Jul. 13, 2020 (KR) .......................... 10-2020-0086157
Oct. 30, 2020 (KR) .......................... 10-2020-0143810

(51) Int. Cl.
*G09G 3/20*        (2006.01)

(52) U.S. Cl.
CPC ....... *G09G 3/2096* (2013.01); *G09G 2370/02* (2013.01); *G09G 2370/045* (2013.01); *G09G 2370/06* (2013.01); *G09G 2370/16* (2013.01)

(58) Field of Classification Search
CPC ......... G06F 13/38; G06F 3/14; G09G 3/2096; G09G 2320/041; G09G 2370/02;
(Continued)

(56) References Cited

U.S. PATENT DOCUMENTS

2009/0327777 A1*  12/2009  Vasquez ............... G09G 3/3611
                                                          348/700
2013/0315298 A1    11/2013  Gao et al.
(Continued)

FOREIGN PATENT DOCUMENTS

JP    2016-085634 A    5/2016
KR    10-2013-0016685 A    2/2013
(Continued)

OTHER PUBLICATIONS

International Search Report dated Oct. 13, 2021, issued in International Application No. PCT/KR2021/008817.
(Continued)

*Primary Examiner* — Stephen G Sherman
(74) *Attorney, Agent, or Firm* — Jefferson IP Law, LLP

(57) ABSTRACT

An electronic device is provided. The electronic device includes a communication circuit, and at least one processor operatively connected to the communication circuit, wherein the at least one processor is configured to establish, via the communication circuit, a communication connection with a display device, identify channel information about a first channel on which the communication connection is established, identify image information about an image displayed in the display device, and based on the channel information about the first channel and the image information, identify
(Continued)

whether the electronic device is capable of transmitting a data frame each communication cycle which corresponds to a frame rate provided in the display device.

12 Claims, 18 Drawing Sheets

(58) Field of Classification Search
CPC ......... G09G 2370/045; G09G 2370/06; G09G 2370/16; H04L 1/00
See application file for complete search history.

(56) References Cited

U.S. PATENT DOCUMENTS

| | | |
|---|---|---|
| 2016/0109931 A1 | 4/2016 | Kobayashi |
| 2016/0182946 A1* | 6/2016 | Diefenbaugh ... H04N 21/43637 345/2.3 |
| 2016/0219522 A1* | 7/2016 | Asterjadhi ........ H04W 52/0274 |
| 2017/0083062 A1* | 3/2017 | Bowers ................... G06F 1/206 |
| 2018/0025478 A1 | 1/2018 | Lee et al. |
| 2018/0027420 A1* | 1/2018 | Takahashi ............. H04W 16/14 370/329 |
| 2018/0063218 A1 | 3/2018 | Kim et al. |

FOREIGN PATENT DOCUMENTS

| | | |
|---|---|---|
| KR | 10-2018-0011539 A | 2/2018 |
| KR | 10-2018-0021997 A | 3/2018 |
| WO | 2010/091113 A2 | 8/2010 |

OTHER PUBLICATIONS

European Search Report dated Sep. 15, 2023; European Appln. No. 21841618.8-1207 / 4137927 PCT/KR2021008817.

* cited by examiner

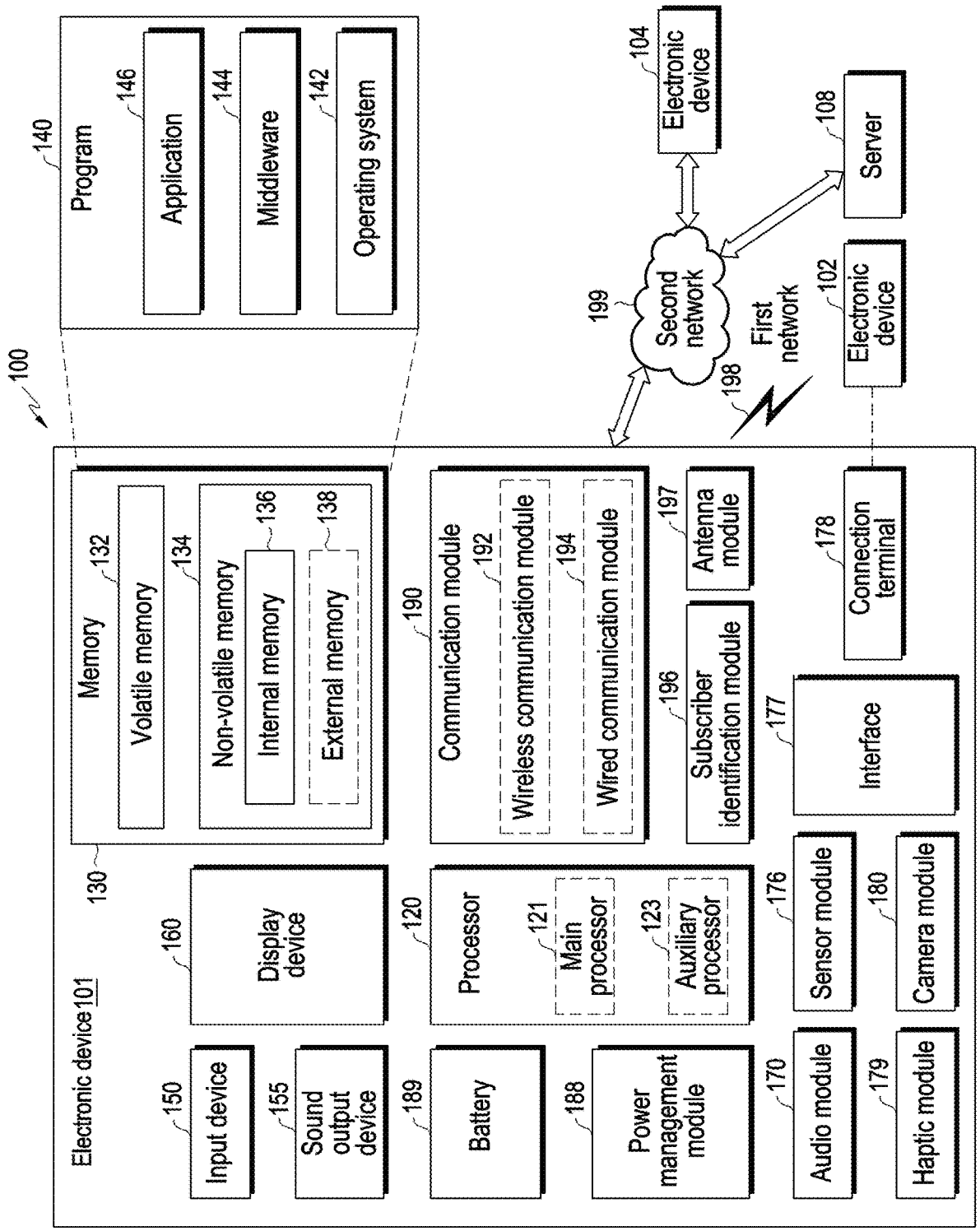

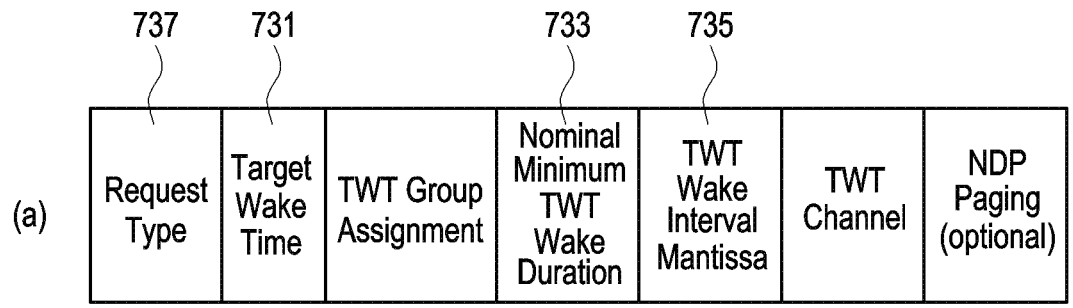
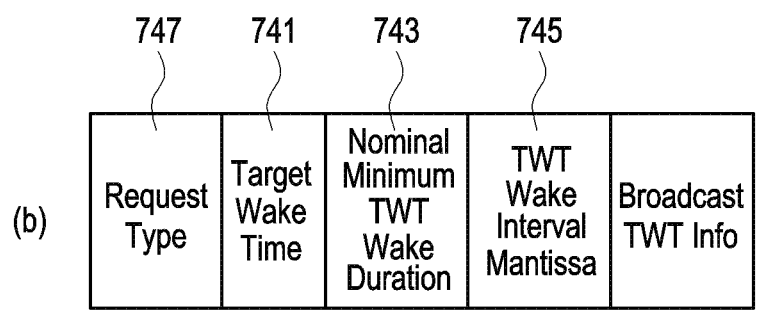
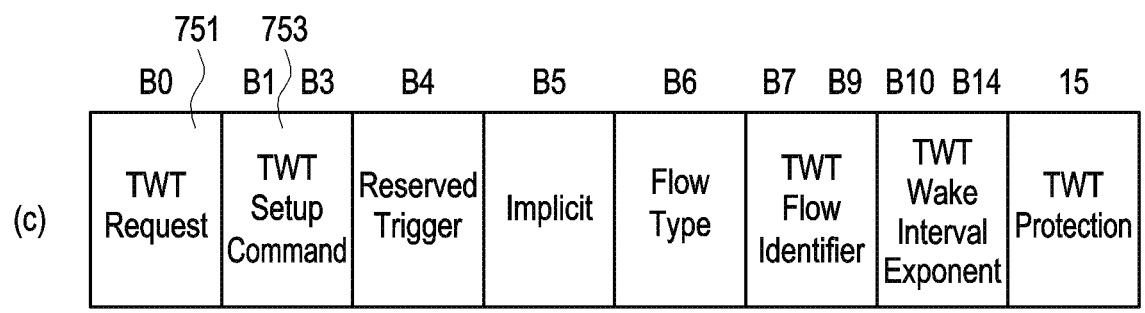
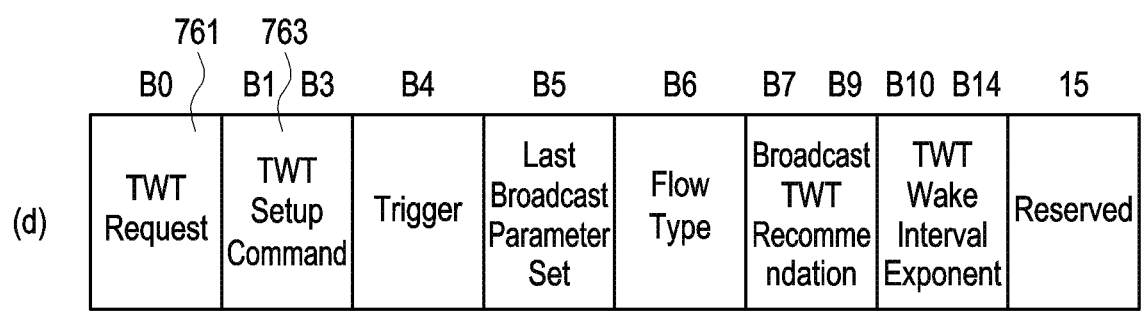
FIG.7B

ELECTRONIC DEVICE, DISPLAY DEVICE CONNECTED TO ELECTRONIC DEVICE, AND OPERATING METHOD THEREOF

CROSS-REFERENCE TO RELATED APPLICATION(S)

This application is a U.S. National Stage application under 35 U.S.C. § 371 of an International application number PCT/KR2021/008817, filed on Jul. 9, 2021, which is based on and claims priority of a Korean patent application number 10-2020-0086157, filed on Jul. 13, 2020, in the Korean Intellectual Property Office, and of a Korean patent application number 10-2020-0143810, filed on Oct. 30, 2020, in the Korean Intellectual Property Office, the disclosure of each of which is incorporated by reference herein in its entirety.

TECHNICAL FIELD

Various embodiments of the disclosure relate to an electronic device, a display device connected to the electronic device, and a method of operating thereof.

BACKGROUND ART

Display devices which are connected to an electronic device and provide an image are being developed. The display devices which are connected to the electronic device and provide the image may receive an image or information processed in the electronic device and display an image based thereon.

Tethered augmented reality (AR) glasses, which exist separately from a computing host (e.g., a smartphone), may operate in connection with the computing host, and transmit, to the computing host, screen information obtained from the tethered AR glasses or various sensing information. The tethered AR glasses may receive an image frame processed in the computing host to provide an AR image.

The above information is presented as background information only to assist with an understanding of the disclosure. No determination has been made, and no assertion is made, as to whether any of the above might be applicable as prior art with regard to the disclosure.

DETAILED DESCRIPTION OF THE DISCLOSURE

Technical Object to be Solved

According to a characteristic of a wireless environment, if the number of devices which use the same channel increases, an opportunity for an electronic device and a display device to occupy a radio resource may decrease due to interference or collision. If the opportunity for the electronic device and the display device to occupy the radio resource decreases, a delay in an image provided in the display device may occur. If the delay in the image provided in the display device is large, it may cause discomfort to a user. Accordingly, in a case of a display device which is connected to an electronic device and provides an image, a low delay may be essentially required in order to provide a user with a satisfactory image.

In addition, a communication with the electronic device needs be performed to provide an image, so battery consumption may be large, and a method for reducing the battery consumption may be required. In addition, as the electronic device transmits large amount of data to the display device and consumes more power, a temperature of the electronic device may increase. In the display device, a temperature of a display may increase due to an increase in data throughput.

Aspects of the disclosure are to address at least the above-mentioned problems and/or disadvantages and to provide at least the advantages described below.

Accordingly, an aspect of the disclosure is to provide an electronic device and a display device which may change a frame rate provided in the display device or change a channel based on channel utilization of a channel used by the electronic device and the display device, and a method of operating thereof.

Another aspect of the disclosure is to provide an electronic device and a display device which may efficiently control heat generation, and a method of operating thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit, and at least one processor operatively connected to the communication circuit, wherein the at least one processor is configured to establish, via the communication circuit, a communication connection with a display device, identify channel information about a first channel on which the communication connection is established, identify image information about an image displayed in the display device, and based on the channel information about the first channel and the image information, identify whether the electronic device is capable of transmitting a data frame each communication cycle which corresponds to a frame rate provided in the display device.

In accordance with another aspect of the disclosure, a method of operating an electronic device is provided. The operating method includes establishing a communication connection with a display device, identifying channel information about a first channel on which the communication connection is established, identifying image information about an image displayed in the display device, and based on the channel information about the first channel and the image information, identifying whether the electronic device is capable of transmitting a data frame each communication cycle which corresponds to a frame rate provided in the display device.

Advantageous Effects

According to various embodiments of the disclosure, an electronic device and a display device which may change a frame rate provided in the display device or change a channel based on channel utilization of a channel used by the electronic device and the display device, and a method of operating thereof may be provided.

According to various embodiments of the disclosure, each of an electronic device and a display device may efficiently control heat generation by changing a frame rate provided in the display device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

FIG. 7B is a diagram illustrating an operation of transmitting information about a communication cycle according to an embodiment of the disclosure;

Throughout the drawings, like reference numerals will be understood to refer to like parts, components, and structures.

MODE FOR CARRYING OUT THE DISCLOSURE

Figure 2A:
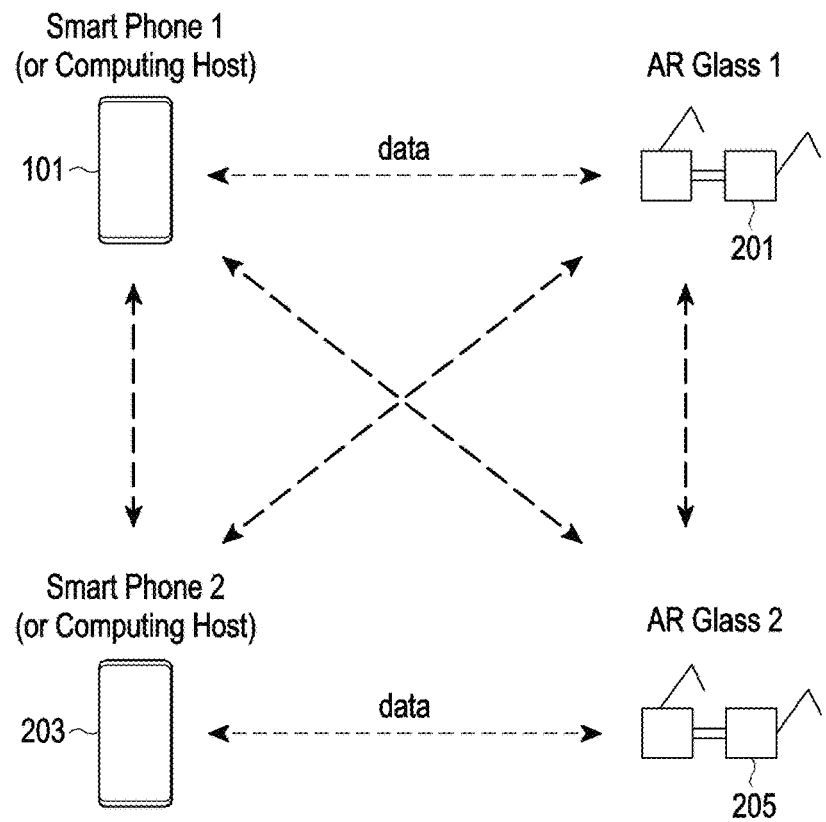
FIG. 2A is a diagram illustrating an environment where a plurality of electronic devices and a plurality of display devices exist according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ Generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a diagram illustrating an environment where a plurality of electronic devices and a plurality of display devices exist according to an embodiment of the disclosure.

Referring to FIG. 2A, an electronic device 101 may establish a communication connection with a display device 201. For example, the electronic device 101 may establish a wireless communication connection with the display device 201 according to a wireless LAN (WLAN) standard of a 2.4 gigahertz (GHz), 5 GHz, or 6 GHz band in institute of electrical and electronics engineers (IEEE) 802.11ac or 802.11ax. In various embodiments of the disclosure, the display device 201 may include an electronic device 102 in FIG. 1, and may include the same components (e.g., components in FIG. 1) as the electronic device 101. After establishing the wireless communication connection, the electronic device 101 may transmit and receive data to and from the display device 201 by using a first channel. If another electronic device 203 and another display device 205 which use the first channel exist, interference or collision may occur, or the electronic device 101 may not use the first channel. For example, the display device 201 receives not only a communication signal from the electronic device 101, but also communication signals from the other electronic device 203 and/or the other display device 205 which use the first channel, so the display device 201 may be affected by signal interference.

Figure 2B:
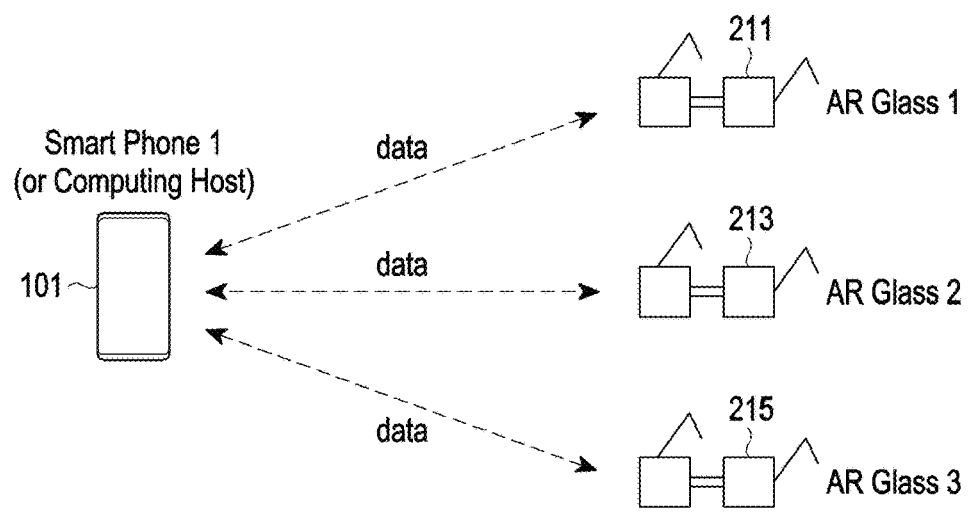
FIG. 2B is a diagram illustrating an environment where an electronic device and a plurality of display devices exist according to an embodiment of the disclosure.

FIG. 2B is a diagram illustrating an environment where an electronic device and a plurality of display devices exist according to an embodiment of the disclosure.

Referring to FIG. 2B, an electronic device 101 may establish a wireless communication connection with each of a first display device 211, a second display device 213, and a third display device 215 according to a WLAN standard of a 2.4 GHz, 5 GHz, or 6 GHz band of IEEE 802.11ac or 802.11ax. The electronic device 101 may transmit data to each of the first display device 211, the second display device 213, and the third display device 215 by using one channel. The electronic device 101 may transmit data related to an image which each display device 211, 213, or 215 needs to display. For example, the electronic device 101 may receive image data from each display device 211, 213, or 215, and transmit, to each display device 211, 213, or 215, information about image generated based on the received image data. According to an embodiment of the disclosure, the information about the image may be generated based on a frame rate provided (or displayed) in the display device 211, 213, or 215 and data amount per frame (for example, the number of bits per frame).

For example, the electronic device 101 may allocate different time to each of the display devices 211, 213, and 215 to transmit information about an image provided in each of the display devices 211, 213, and 215. According to a frame rate provided in the display devices 211, 213, and 215, the electronic device 101 may periodically transmit data to each of the display devices 211, 213, and 215. For example, the frame rate provided in the display devices 211, 213, and 215 may be determined based on an application or service run in the electronic device 101 and the display devices 211, 213, 215, or may be determined based on a frame rate requested or supported in the display devices 211, 213, 215. According to an embodiment of the disclosure, the number of display devices to which the electronic device 101 transmits data by using one channel may be limited based on data amount of an image provided in the display devices 211, 213, and 215 and a network bandwidth.

For another example, the electronic device 101 may allocate a different frequency resource to each of the display devices 211, 213, and 215 to transmit information about an image provided in each of the display devices 211, 213, and 215. For example, the electronic device 101 may allocate a different frequency resource to each of the display devices 211, 213, and 215 by using an orthogonal frequency division multiple access (OFDMA) scheme. In this case, as a network bandwidth decreases in inverse proportion to the number of display devices which receive data from the electronic device 101 by using the one channel, minimum time (e.g., a service period) for transmitting the data may increase, so the number of the display devices which receive the data from the electronic device 101 by using the one channel may be limited.

For still another example, the electronic device 101 may allocate a different antenna resource (or a different spatial beam resource) to each of the display devices 211, 213, and 215 to transmit information about an image provided in each of the display devices 211, 213, and 215. For example, the electronic device 101 may allocate a different spatial beam resource to each of the display devices 211, 213, and 215 by using a multi-user multiple-input multiple-output (MU MIMO) scheme. In this case, as a network bandwidth decreases in inverse proportion to the number of display devices which receive data from the electronic device 101 by using one channel, minimum time (e.g., a service period) for transmitting data may increase, so the number of the display devices which receive the data from the electronic device 101 by using the one channel may be limited.

According to an embodiment of the disclosure, the electronic device 101 may include a display module 160 which is foldable and/or rollable. The electronic device 101 may change the number of display devices 211, 213, and 215 which may be connected to the electronic device 101 based on state information (e.g., folded, wound, or unfolded) of the display module 160. For example, if the state information of the display module 160 indicates a folded state or a wound state, the electronic device 101 may transmit information about an image to one of the display devices (e.g., 211, 213, and 215). For another example, if the state information of the display module 160 indicates a unfolded state, the electronic device 101 may transmit information about an image to the plurality of display devices (e.g., 211, 213, and 215).

Figure 3:
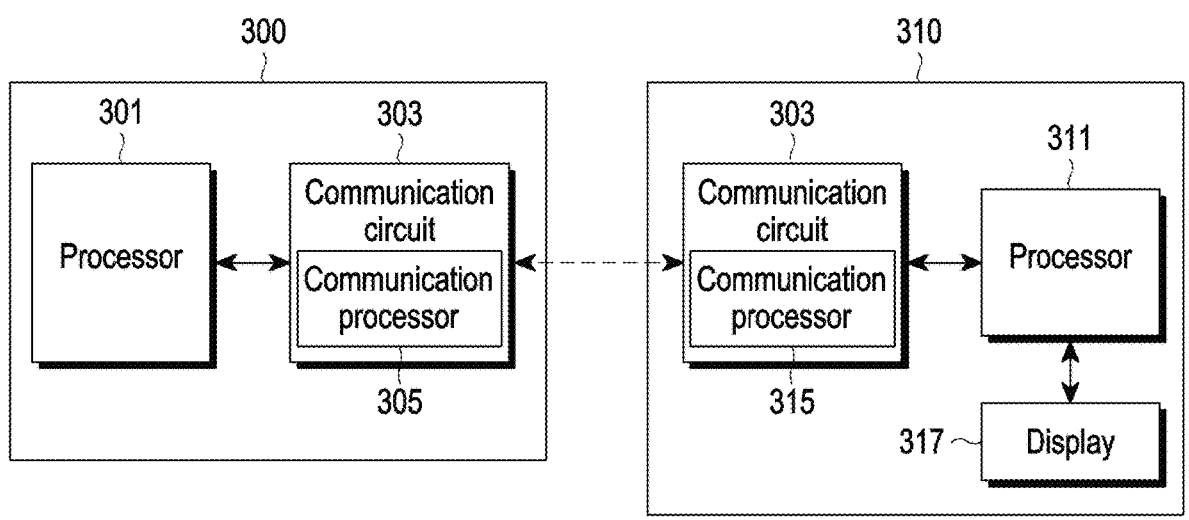
FIG. 3 is a block diagram schematically illustrating a structure of an electronic device and a display device according to an embodiment of the disclosure.

FIG. 3 is a block diagram schematically illustrating a structure of an electronic device and a display device according to an embodiment of the disclosure.

Referring to FIG. 3, an electronic device 300 (e.g., an electronic device 101 in FIG. 1) may be a smartphone, and a display device 310 (e.g., an electronic device 102 in FIG. 1) may be tethered augmented reality (AR) glasses. The electronic device 300 and the display device 310 may establish a communication connection and transmit and receive data. For example, the electronic device 300 may receive scene information or sensing information obtained in the display device 310, perform image processing, and transmit it to the display device 310. The display device 310 may receive an image or information processed in the electronic device 300 to display the image.

Referring to FIG. 3, the electronic device 300 (e.g., the electronic device 101 in FIG. 1) may include a processor 301 (e.g., a processor 120 in FIG. 1) and a communication circuit 303 (e.g., a communication module 190 in FIG. 1), and the communication circuit 303 may include a communication processor 305 (e.g., a communication processor (not shown) in FIG. 1).

According to various embodiments of the disclosure, the processor 301 may include an application processor. The processor 301 may control the electronic device 300 to perform a designated operation or control to another hardware (e.g., the communication circuit 303) to perform the designated operation.

According to various embodiments of the disclosure, the processor 301 may control the communication circuit 303 to establish a communication connection (e.g., a first network 198 in FIG. 1) with the display device 310. For example, the communication connection may include a Wi-Fi network. For example, the processor 301 may control the communication circuit 303 to establish a wireless connection with the display device 310 by using a WLAN standard of a 2.4 GHz, 5 GHz, or 6 GHz band of an IEEE 802.11ac or 802.11ax. For another example, the processor 301 may control the communication circuit 303 to establish a wireless connection with the display device 310 by using a WLAN standard of a 60 GHz band of an IEEE 802.11ad or 802.11ay.

According to various embodiments of the disclosure, the processor 301 may control the communication circuit 303 to identify channel information about a first channel where a communication connection is established. For example, the channel information may include a network bandwidth and/or channel utilization. For example, the network bandwidth may be based on a standard used for a communication connection between the electronic device 300 and the display device 310, a channel bandwidth, a maximum number of spatial streams, and a received signal quality. The communication circuit 303 may exchange a frame, e.g., an association request and an association response for a connection with the communication circuit 313 of the display device 310. A frame for a communication connection between the electronic device 300 and the display device 310 may include information about a standard, a channel bandwidth, and a maximum number of spatial streams. For example, the standard may be one of IEEE 802.11a, b, g, n, ac, ax, ad, or ay standard. For example, the channel bandwidth may be one of 20 megahertz (MHz), 40 MHz, 80 MHz, 160 MHz, 320 MHz, 2.16 GHz, 4.32 GHz, 6.48 GHz, or 8.64 GHz. For example, the maximum number of spatial streams may be between 1 and 16. The communication circuit 303 may measure signal quality of a received signal. For example, the communication circuit 303 may estimate a maximum modulation method and channel coding rate or a maximum MCS index which may be used in a wireless communication by comparing a receiver minimum input level sensitivity value defined in each standard and received signal quality. The communication circuit 303 may calculate a maximum data rate defined in a standard based on a standard, a channel bandwidth, a maximum number of spatial streams, and a maximum MCS index value which is based on a received signal quality. The communication circuit 303 may define the calculated maximum data rate as a network bandwidth. The communication circuit 303 may perform an operation of measuring channel utilization. For example, the channel utilization may be calculated as a ratio of designated time to time during which a wireless channel is occupied by wireless packets of other electronic devices.

All or part of an operation of identifying the channel information about the first channel may be performed by the communication processor 305.

According to various embodiments of the disclosure, the processor 301 may identify image information about an image provided in the display device 310. For example, the processor 301 may identify a frame rate and data amount per frame (e.g., the number of bits per frame) provided (or displayed) in the display device 310. The frame rate may be referred to as a refresh rate depending on implementation.

According to various embodiments of the disclosure, the processor 301 may identify whether the electronic device 101 may transmit a data frame every communication cycle which corresponds to the frame rate provided in the display device 310 based the channel information about the first channel and the image information. For example, the communication cycle corresponding to the frame rate provided in the display device 310 may be in inverse proportion to the frame rate. For example, as the frame rate provided in the display device 310 increases, the electronic device 101 needs to transmit information (e.g., image data) for frame configuration to the display device 310 at a faster cycle. Here, the communication cycle may be a minimum value at which the electronic device 101 needs to transmit the information about the frame configuration so that the display device 310 may provide (or display) frames at a target frame rate, however, there is no limitation therefor. For example, the minimum service period may be a value obtained by dividing the data amount per frame by a network bandwidth of the first channel. For example, a service period may be calculated by summing a minimum service period and a retransmission period for loss of a wireless interval. For example, if a period which is generated by excluding a period which corresponds to the channel utilization of the first channel from the communication cycle which corresponds to the frame rate is longer than the service period, the processor 301 may identify that the electronic device 101 may transmit a data frame every communication cycle which corresponds to the frame rate.

According to an embodiment of the disclosure, the electronic device 101 may monitor the first channel during designated time in order to identifying channel utilization of the first channel. For example, the electronic device 101 may calculate the channel utilization by detecting a signal whose strength is stronger than or equal to designated strength on the first channel during designated time. For example, the electronic device 101 may calculate the channel utilization based on a ratio of the designated time to an interval during which the signal whose strength is stronger than or equal to the designated strength (e.g., −80 decibel-milliwatts (dBm)) is detected on the first channel.

According to various embodiments of the disclosure, if the electronic device 101 is capable of transmitting the data frame every communication cycle which corresponds to the frame rate of the display device 310, the processor 301 may control the communication circuit 303 to transmit the data frame according to the communication cycle.

According to various embodiments of the disclosure, if the electronic device 101 is incapable of transmitting the data frame every communication cycle which corresponds to the frame rate of the display device 310, the processor 301 may inquire the display device 310 about whether the display device 310 is capable of changing the communication cycle which corresponds to the frame rate. For example, the processor 301 may identify whether the communication cycle may be changed according to an application which is run based on a connection with the display device 310. For example, for an application which requires natural screen switching, such as a game application, the frame rate may be set to be immutable. For another example, for an application capable of changing image quality, such as a video application, the frame rate may be set to be changeable.

According to various embodiments of the disclosure, if the communication cycled corresponding to the frame rate is possible to be changed, the processor 301 may change the communication cycle which corresponds to the frame rate. The processor 301 may control the communication circuit 303 to transmit, to the display device 310, information about a communication cycle which corresponds to the changed frame rate. For example, the processor 301 may transmit, to the display device 310, the information about the communication cycle by using a target wake time (TWT) wake interval field of a TWT protocol.

According to various embodiments of the disclosure, if it is impossible to change the communication cycle which corresponds to the frame rate, the processor 301 may transmit, to the display device 310, information about a second channel, not the first channel. For example, the processor 301 may transmit, to the display device 310, the information about the second channel through an out of band (00B). For example, if the electronic device 300 and the display device 310 establish a communication connection through a Wi-Fi network, the processor 301 may transmit, to the display device 310, the information about the second channel by using Bluetooth low energy (BLE). Accordingly, the electronic device 301 and the display device 310 may change a Wi-Fi channel without delay.

All or some of operations of the processor 301 described above may be performed by a communication processor 305.

According to various embodiments of the disclosure, the communication circuit 303 may include the communication processor 305 which controls the electronic device 300 to perform a designated operation or controls another hardware of the communication circuit 303 to perform the designated operation.

According to various embodiments of the disclosure, the communication circuit 303 may receive a communication signal from the outside or transmit a communication signal to the outside based on a Wi-Fi communication scheme. According to various embodiments of the disclosure, the communication circuit 303 may include a component, for example, a modulator, a digital-analog (D/A) converter, a frequency converter, an analog-digital (A/D) converter, an amplifier, and/or a demodulator, for orthogonal frequency division multiplexing (OFDM) or orthogonal frequency division multiple access (OFDMA).

According to various embodiments of the disclosure, the communication processor 305 may identify channel information about a first channel on which a communication connection is established. For example, the communication circuit 303 may exchange a frame, for example, an association request and an association response, for a connection with the communication circuit 313 of the display device 310. The frame for the connection may include information about a standard, a channel bandwidth, and/or a maximum number of spatial streams which may be used in a wireless communication. The communication circuit 303 may measure signal quality of a received signal. For example, the communication circuit 303 may estimate a maximum modulation method and a channel coding rate, and/or a maximum MCS index which may be used in the wireless communication by comparing a receiver minimum input level sensitivity value defined in each standard with the signal quality of the received signal. A maximum data rate defined in a standard may be calculated based on the maximum modulation method and channel coding rate, and/or the maximum MCS index which are based on the standard, the channel bandwidth, the maximum number of spatial streams, and the signal quality of the received signal, and the maximum data rate may be defined as a network bandwidth.

The communication circuit 303 may perform an operation of measuring channel utilization. For example, the channel utilization may be calculated as a ratio of designated time to time during which a wireless channel is occupied by wireless packets by other electronic devices.

According to various embodiments of the disclosure, the communication processor 305 may control the communication circuit 303 to transmit wireless scheduling setting information to the display device 310. For example, the communication processor 305 may transmit the wireless scheduling setting information indicating a time point at which a service starts, a service period, and a cycle at which the service restarts by using a TWT protocol.

Referring to FIG. 3, the display device 310 (e.g., the electronic device 102 in FIG. 1) may include a processor 311 (e.g., a processor 120 in FIG. 1), a communication circuit 313 (e.g., a communication module 190 in FIG. 1), and a display 317 (e.g., a display module 160 in FIG. 1), and the communication circuit 313 may include a communication processor 315 (e.g., a communication processor (not shown) in FIG. 1).

According to various embodiments of the disclosure, the processor 311 may include an application processor. The processor 311 may control the display device 310 to perform a designated operation or control another hardware (for example, the communication circuit 313) to perform the designated operation.

According to various embodiments of the disclosure, the processor 311 may control the communication circuit 313 to establish a wireless communication (e.g., a first network 198 in FIG. 1) with the electronic device 300. For example, the wireless communication may include a Wi-Fi network. For example, the processor 311 may control the communication circuit 313 to establish a wireless connection with the electronic device 300 by using a WLAN standard of a 2.4 GHz, 5 GHz, or 6 GHz band of IEEE 802.11ac or 802.11ax. For another example, the processor 311 may control the communication circuit 313 to establish a wireless connection with the electronic device 300 by using a WLAN standard of a 60 GHz band of IEEE 802.11ad or 802.11ay.

According to various embodiments of the disclosure, the processor 311 may control the communication circuit 313 to receive information about a communication cycle which corresponds to a frame rate from the electronic device 300. For example, the information about the communication cycle corresponding to the frame rate may be a TWT response or a TWT request. Each of the TWT response and the TWT request may include a target wake time field, a target wake duration field, and a target wake interval field. Upon receiving the TWT response or TWT request, the processor 311 may set service period start time according to a target wake time field value, set time during which a service period is maintained according to a target wake duration field value, and set a cycle at which the service period restarts according to a target wake interval field value.

According to various embodiments of the disclosure, the processor 311 may wake up the communication circuit 313 to transmit and receive data during a set service period. For example, the processor 311 may receive at least one data frame which corresponds to an image displayed in the display device 310 during the set service period.

According to various embodiments of the disclosure, the display 137 may display, via the communication circuit 313, data received from the electronic device 300. For example, the display 317 may display an image which is based on a plurality of data frames received from the electronic device 300 at a communication cycle which corresponds to a frame rate.

According to various embodiments of the disclosure, the display 137 of the display device 310 may be foldable and/or rollable. In an embodiment of the disclosure, a frame rate and data amount per frame requested in the display device 310 may be changed based on a state (e.g., folded, wound, or unfolded) of the display 137. For example, a frame rate and/or data amount per frame on a state in which the display 137 is folded may be greater than a frame rate and/or data amount per frame on a state in which the display 137 is wound.

All or some of operations of the processor 311 described above may be performed by the communication processor 315.

According to various embodiments of the disclosure, the communication circuit 313 may include the communication processor 315 which controls the display device 310 to perform a designated operation or which controls another hardware of the communication circuit 313 to perform a designated operation.

According to various embodiments of the disclosure, the communication circuit 303 may receive a communication signal from the outside or transmit a communication signal to the outside based on a Wi-Fi communication scheme. According to various embodiments of the disclosure, the communication circuit 303 may include a component, for example, a modulator, a D/A converter, a frequency converter, an A/D converter, an amplifier, and/or a demodulator, for OFDM or OFDMA.

According to various embodiments of the disclosure, the communication processor 315 may periodically repeat a wake state and a sleep state (or an idle state) based on TWT information. For example, the communication processor 315 may wake up at a time point which corresponds to a target wake time field value, maintain a wake state during time which corresponds to a target wake duration field value, transition into a sleep state, and perform a wake-up operation at a cycle which corresponds to a target wake interval field value. The communication processor 315 may receive at least one data frame from the electronic device 300 while maintaining the wake state (i.e., a service period (SP)).

Figure 4:
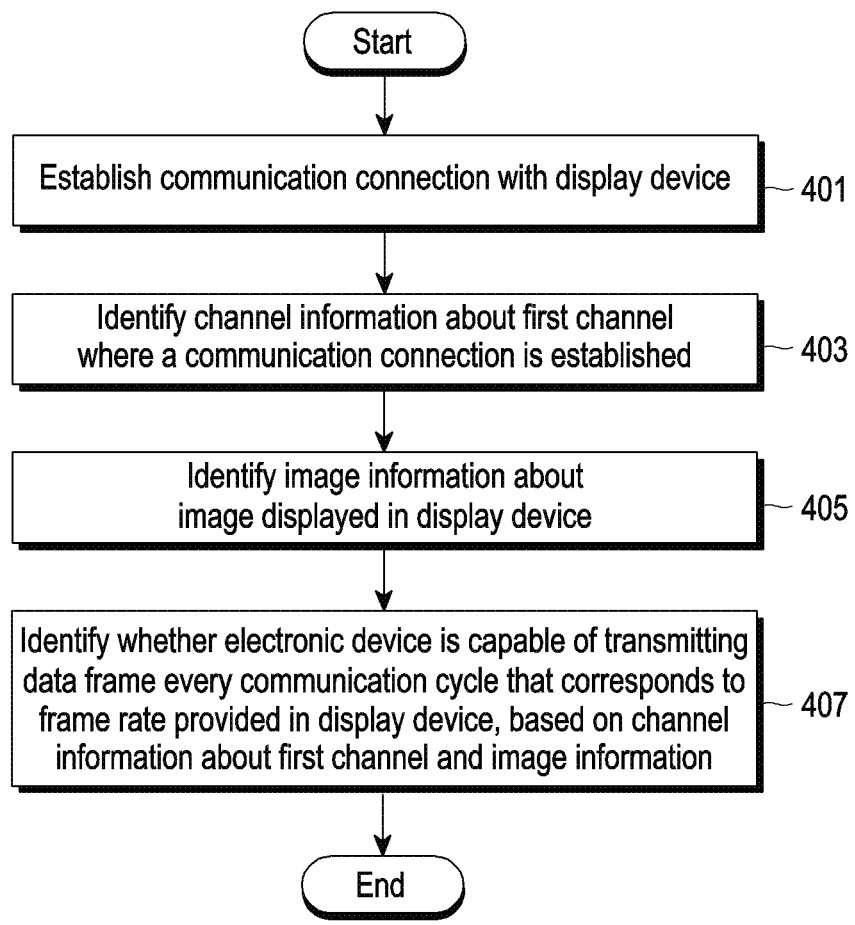
FIG. 4 is a flowchart illustrating an operation of an electronic device according to an embodiment of the disclosure.
Figure 5A:
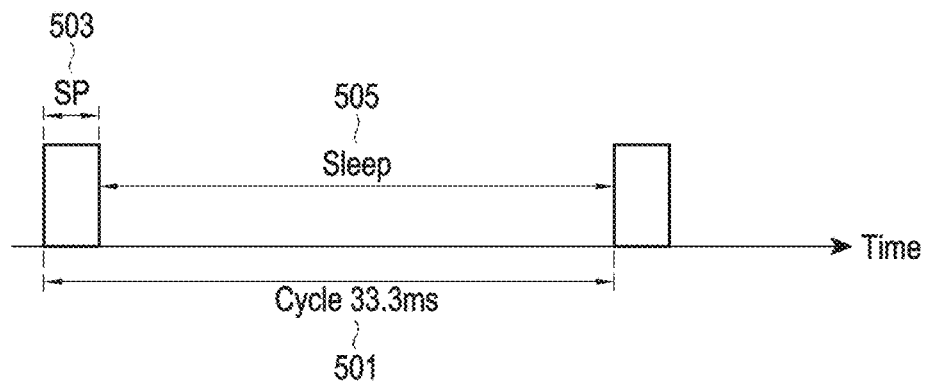
FIG. 5A is a diagram illustrating a communication cycle according to an embodiment of the disclosure.
Figure 5B:
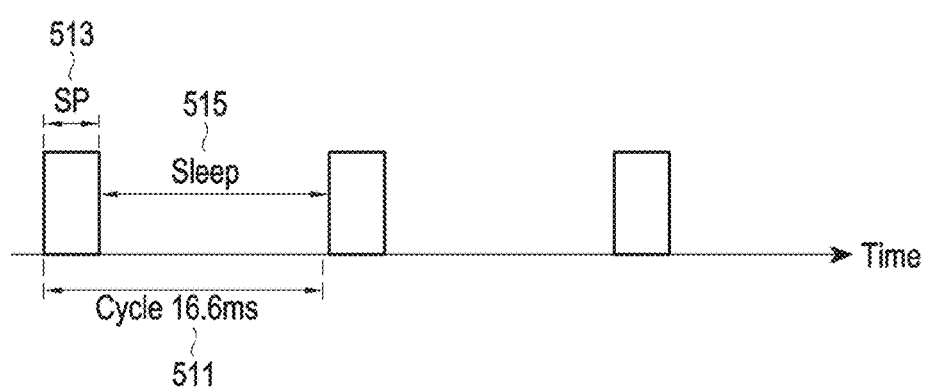
FIG. 5B is a diagram illustrating a communication cycle according to an embodiment of the disclosure.
Figure 5C:
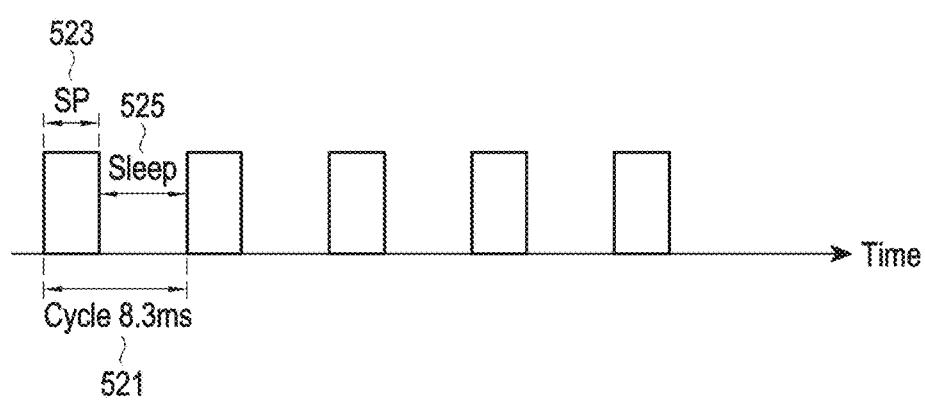
FIG. 5C is a diagram illustrating a communication cycle according to an embodiment of the disclosure.

FIG. 4 is a flowchart illustrating an operation of an electronic device according to an embodiment of the disclosure. An embodiment in FIG. 4 will be described with reference to FIGS. 5A, 5B, and 5C. FIGS. 5A, 5B, and 5C diagrams illustrating a communication cycle according to an embodiment of the disclosure.

An order of operations in FIG. 4 is not limited, and other operations may be additionally performed between two adjacent operations. In addition, at least some of the operations in FIG. 4 may be omitted, and a description may be equally applied to an entire flowchart of the disclosure. In the disclosure, an expression that an electronic device 101 performs a designated operation may mean that a processor 120 in the electronic device 101 performs the designated operation, or the processor 120 controls another hardware to perform the designated operation.

Referring to FIG. 4, in operation 401, the electronic device 101 (e.g., the electronic device 101 in FIG. 1) may establish a communication connection with a display device (e.g., a display device 201 in FIG. 2A). For example, the communication connection may follow a WLAN standard of a 2.4 GHz, 5 GHz or 6 GHz band of IEEE 802.11ac or 802.11ax. For another example, the communication connection may follow a WLAN standard of a 60 GHz band of IEEE 802.11ad or 802.11ay.

According to various embodiments of the disclosure, in operation 403, the electronic device 101 may identify channel information about a first channel on which a communication connection is established. For example, the channel information about the first channel may include a network bandwidth of the first channel and channel utilization of the first channel. For example, a communication circuit 303 may exchange a frame, for example, an association request and an association response, for a connection with a communication circuit 313 in a display device 310. The frame for the connection may include information about a standard, a channel bandwidth, and a maximum number of spatial streams which may be used in a wireless communication. The communication circuit 303 may measure signal quality of a received signal. For example, the communication circuit 303 may estimate a maximum modulation method and channel coding rate, and/or a maximum MCS index which may be used in a wireless communication by comparing a receiver minimum input level sensitivity value defined in each standard with the signal quality of the received signal. A maximum data rate defined in a standard may be calculated based on the maximum modulation method and channel coding rate, and/or the maximum MCS index which are based on the standard, the channel bandwidth, the maximum number of spatial streams, and the signal quality of the received signal, and the maximum data rate may be defined as a network bandwidth.

The communication circuit 303 may perform an operation of measuring channel utilization. For example, the channel utilization may be calculated as a ratio of designated time to time during which a wireless channel is occupied by radio packets by other electronic devices.

According to various embodiments of the disclosure, in operation 405, the electronic device 101 may identify image information about an image displayed in a display device 201. The image information may include a frame rate and data amount per frame provided in the display device 201. The frame rate provided in the display device 201 may mean the number of frames per second displayed in the display device 201. For example, a frame rate of 120 frames per second (fps) may mean that the electronic device 101 transmits 120 frames per second to the display device 201. The data amount per frame may mean data amount required for the electronic device 101 to transmit one frame to the display device 201.

According to various embodiments of the disclosure, in operation 407, the electronic device 101 may identify whether the electronic device 101 is capable of transmitting a data frame every communication cycle which corresponds to the frame rate provided in the display device 201, based on the channel information about the first channel and the image information. The electronic device 101 may identify a communication cycle, a service period, and channel utilization, and, if sum of the service period and a period which corresponds to the channel utilization is shorter than the communication cycle, the electronic device 101 is capable of transmitting the data frame every communication cycle.

A frame rate means the number of frames per second displayed in the display device 201, so the communication cycle may be in inverse proportion to the frame rate. For example, referring to FIG. 5A, if the frame rate is 30 fps, a communication cycle corresponding to the frame rate may be about 33.3 ms (1 frame/30 fps) 501. For example, if the electronic device 101 transmits at least one frame to the display device 201 every cycle of 33.3 ms, the frame rate of 30 fps may be satisfied. As shown in FIG. 5B, if the frame rate is 60 fps, a communication cycle corresponding to the frame rate may be about 16.6 ms (1 frame/60 fps). For example, if the electronic device 101 transmits at least one frame to the display device 201 every cycle of 16.6, the frame rate of 60 fps may be satisfied. As shown in FIG. 5C, if the frame rate is 120 fps, a communication cycle which corresponds to the frame rate may be about 8.3 ms (1 frame/120 fps). For example, if the electronic device 101 transmits at least one frame to the display device 201 every cycle of 8.3 ms, the frame rate of 120 fps may be satisfied.

Referring to FIGS. 5A, 5B, and 5C, a communication cycle 501, 511, or 521 may include an SP 503, 513, or 523 and a sleep period 505, 515, or 525. The service period 503, 513, or 523 may be a period in which the display device 201 may wake up, and transmit and receive data. During the service period 503, 513, or 523, the electronic device 101 may transmit data to the display device 201. During the sleep period 505, 515, or 525, the electronic device 101 and/or the display device 201 may be in an idle state in which a designated task is not performed.

The service periods 503, 513, and 523 may be determined by a network bandwidth, data amount per frame, and allocation time for retransmission. For example, if the electronic device 101 and the display device 201 are wirelessly connected with a bandwidth of 160 MHz of an IEEE 802.11ax-based WLAN standard and capable of supporting two spatial streams by using a MIMO scheme, (if it is assumed that the electronic device 101 and the display device 201 operate at sufficiently good signal quality within a short distance), a physical layer link speed of up to 2400 Mbps may be provided. In addition, assuming that a data frame is transmitted based on a transmission control protocol (TCP) and efficiency of a TCP communication is 75% of a physical layer link speed, a network bandwidth may be assumed to be 1800 Mbps (2400 Mbps*0.75). In addition, assuming that data transmission amount of 1.8 megabits (Mbits) per frame transmitted from the electronic device 101 to the display device 201 is required, a minimum service period may be 1 ms (1.8 Mbit/1800 Mbps). In addition, assuming that retransmission due to loss of a wireless interval is 100% of the minimum service period, the service period 503, 513, or 523 may be 2 ms. In other words, image transmission without delay may be possible only if one display device 201 occupies a service period of 2 ms. For example, as shown in (c), if the frame rate is 120 fps and the service period is 2 ms, a service for up to 4 display devices on one channel may be possible. For another example, if the frame rate is 120 fps, the service period is 2 ms, and the channel utilization is 80% (8.3 ms*0.8=6.64 ms), a period during which the electronic device 101 and the display device 201 may occupy is 1.66 ms (8.3 ms−6.64 ms=1.66 ms), so a data frame may be transmitted every communication cycle.

Figure 6:
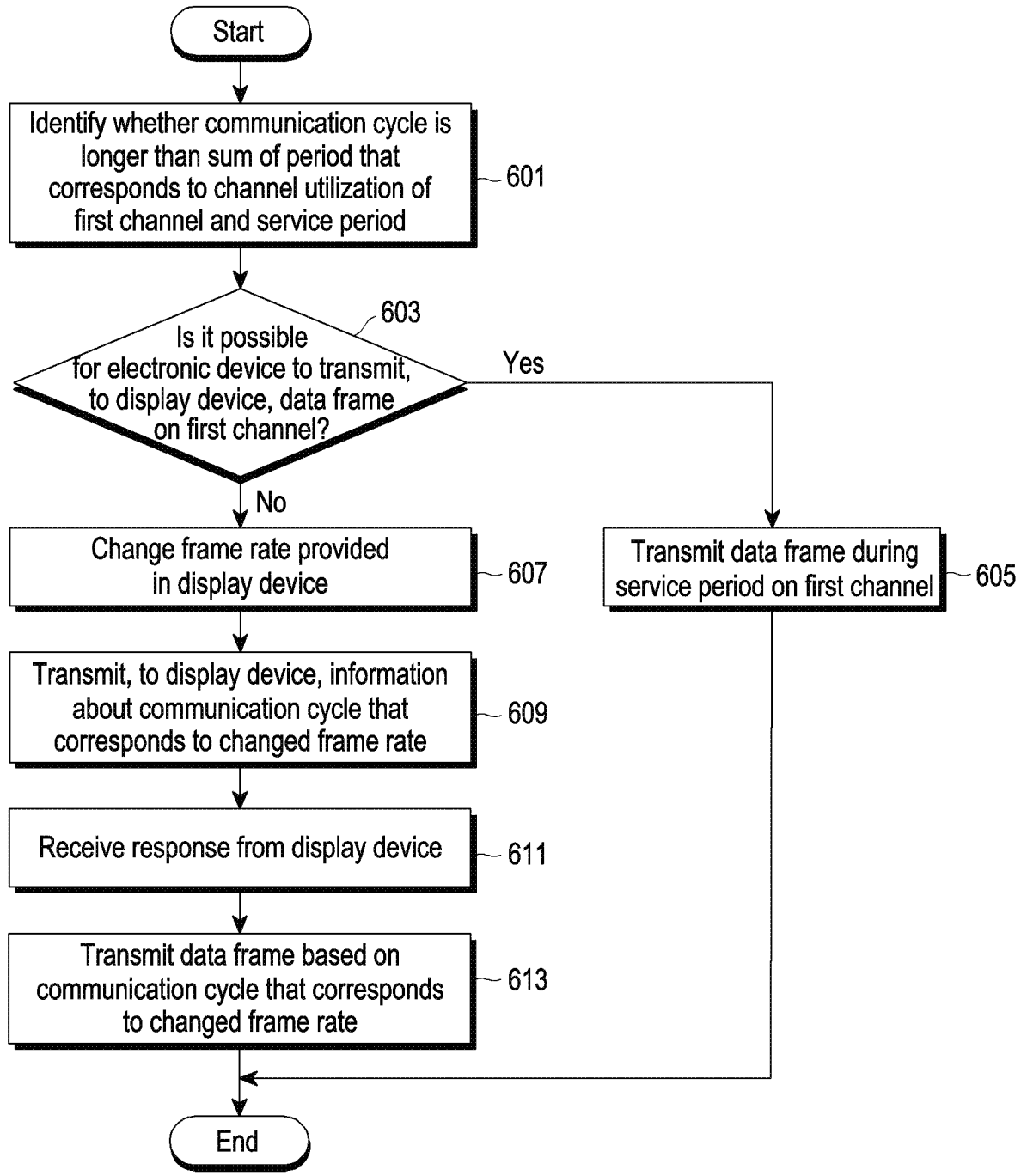
FIG. 6 is a flowchart for describing an operation of an electronic device according to an embodiment of the disclosure.
Figure 7A:
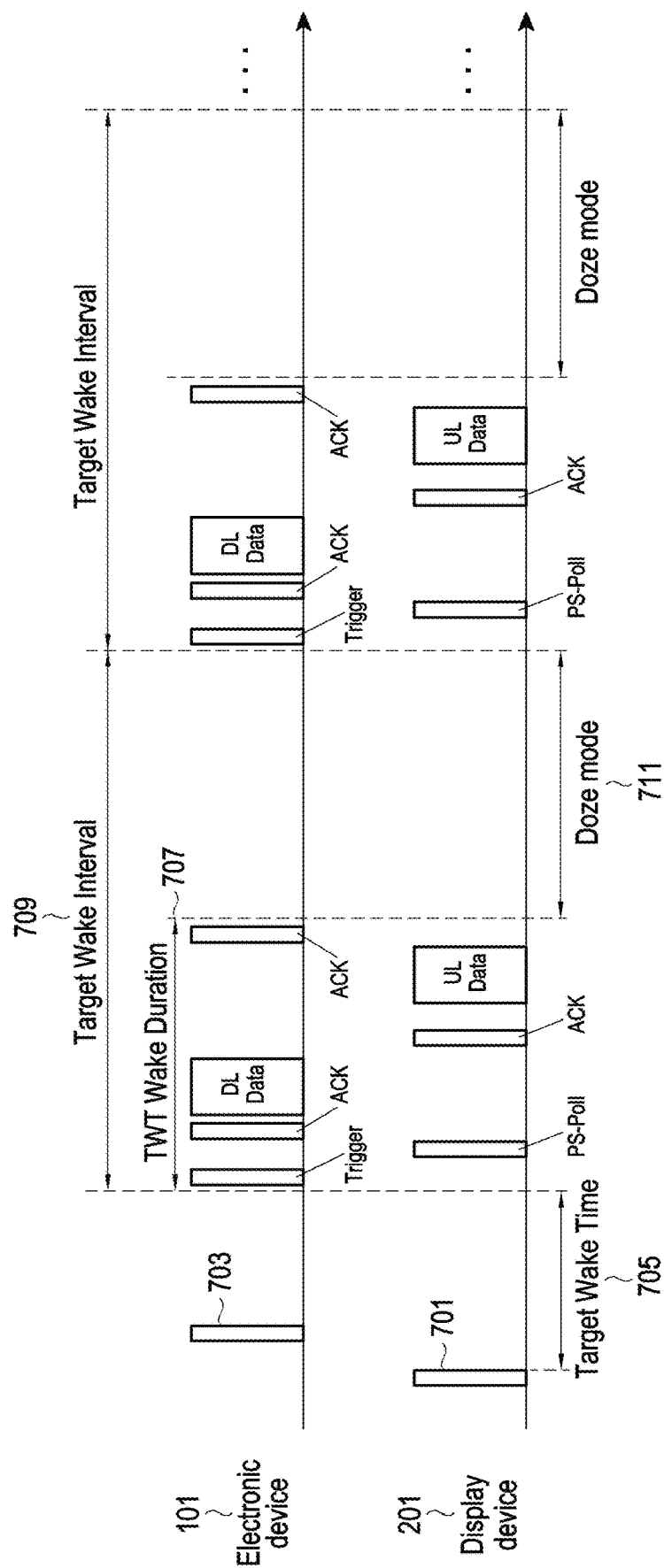
FIG. 7A is a diagram illustrating an operation of transmitting information about a communication cycle according to an embodiment of the disclosure.

FIG. 6 is a flowchart illustrating an operation of an electronic device according to an embodiment of the disclosure. An embodiment in FIG. 6 will be described with reference to FIGS. 7A to 7B. FIG. 7A is a diagram illustrating an operation of transmitting information about a communication cycle according to an embodiment of the disclosure. FIG. 7B is a diagram illustrating an operation of transmitting information about a communication cycle according to an embodiment of the disclosure.

Referring to FIG. 6, in operation 601, an electronic device 101 (e.g., an electronic device 101 in FIG. 1) may identify whether a communication cycle between the electronic device 101 and a display device 201 (e.g., a display device 201 in FIG. 2A) is longer than a sum of a period which corresponds to channel utilization of a first channel and a service period. For example, if a frame rate provided in the display device 201 is 120 fps, a communication cycle may be 8.3 ms (1 frame/120 fps). For example, if channel utilization is 20% (8.3 ms*0.2=1.66 ms) and a service period is 2 ms, it may be determined that the communication cycle (8.3 ms) is longer than a sum (1.66 ms+2 ms=3.66 ms) of a period (1.66 ms) which corresponds to the channel utilization of the first channel and the service period (2 ms). For example, if the channel utilization is 80% (8.3 ms*0.8=6.64 ms) and the service period is 2 ms, it may be determined that the communication cycle (8.3 ms) is shorter than a sum (6.64 ms+2 ms=8.64 ms) of a period (6.64 ms) which corresponds to the channel utilization of the first channel and the service period (2 ms). Meanwhile, the service period may be changed by at least one of a network bandwidth, data amount per frame, and a period for retransmission time.

According to various embodiments of the disclosure, in operation 603, the electronic device 101 may identify whether it is possible to transmit, to the display device 201 (e.g., the display device 201 in FIG. 2A), a data frame on a first channel. If a communication cycle is longer than a sum of a period which corresponds to channel utilization of the first channel and a service period, the electronic device 101 may identify that the electronic device 101 may transmit a data frame to the display device 201 during the service period within the communication cycle which corresponds to the frame rate.

If it is identified that the data frame may be transmitted to the display device 201 on the first channel (603—Yes), according to various embodiments of the disclosure, the electronic device 101, in operation 605, may transmit the data frame to the display device 201 during the service period on the first channel.

If it is identified that the data frame may not be transmitted to the display device 201 on the first channel (603—No), according to various embodiments of the disclosure, the electronic device 101, in operation 607, may change the frame rate provided in the display device 201. For example, the electronic device 101 may change the frame rate provided in the display device 201 from 120 bps to 60 bps. As the frame rate is changed, the communication cycle may be changed from 8.3 ms to 16.6 ms.

According to various embodiments of the disclosure, in operation 609, the electronic device 101 may transmit, to the display device 201, information about a communication cycle which corresponds to the changed frame rate. For example, the information about the communication cycle may include information about a time point at which a service period starts, information about time during which the service period is maintained, and information about a cycle at which service time is restarted. The electronic device 101 may transmit information about a communication cycle by using a TWT protocol. For example, the electronic device 101 may transmit, to the display device

201, a TWT response or a TWT request including the information about the communication cycle.

For example, the electronic device 101 may transmit a TWT response including the information about the communication cycle in response to the TWT request received from the display device 201. Referring to FIG. 7A, the display device 201 may transmit a TWT request 701 to the electronic device 101. The display device 201 may transmit the TWT request 701 including (a) or (b) in FIG. 7B to the electronic device 101. For example, (a) in FIG. 7B may be an individual TWT parameter set field format according to IEEE 802.11. Target wake time 731 included in the individual TWT parameter set field format may mean information about a time point (e.g., 705 in FIG. 7A) at which a service period starts, nominal minimum TWT wake duration 733 may mean information about time (e.g., 707 in FIG. 7A) during which the service period is maintained, and TWT wake interval mantissa 735 may mean information about a cycle (e.g., 709 in FIG. 7A) at which the service period is restarted. The cycle (e.g., 709 in FIG. 7A) of the service period may include time (e.g., 707 in FIG. 7A) during which the service period is maintained and a sleep state (e.g., a doze mode) (e.g., 711 in FIG. 7A). For example, (b) in FIG. 7B may be a broadcast TWT parameter set field format according to IEEE 802.11. Target wake time 741 included in the broadcast TWT parameter set field format may mean information about a time point (e.g., 705 in FIG. 7A) at which a service period starts, nominal minimum TWT wake duration 743 may mean information about time (e.g., 707 in FIG. 7A) during which the service period is maintained, and TWT wake interval mantissa 745 may mean information about a cycle (e.g., 709 in FIG. 7A) at which the service period is restarted.

According to an embodiment of the disclosure, the electronic device 101 and the display device 201 may perform time synchronization between devices. For example, if the electronic device 101 and the display device 201 perform a peer to peer (P2P) connection or a SoftAP-STA connection, a device which performs an AP role among the electronic device 101 and the display device 201 may transmit a frame including a Timing synchronization function (TSF) to a device which performs a station (STA) role. The electronic device 101 and the display device 201 may synchronize a timer based on an STF. The electronic device 101 and the display device 201 may operate according to the target wake time 741, the nominal minimum TWT wake duration 743, or the TWT wake interval mantissa 745 based on the synchronized timer. The electronic device 101 may transmit a TWT response 703 to the display device 201. Each of the TWT request 701 and the TWT response 703 may include the TWT parameter set field, so the electronic device 101 may transmit the information about the communication cycle by using the TWT response 703.

Meanwhile, referring to FIG. 7A, it has been described that the electronic device 101 transmits the TWT response, however, in general, when performing a wireless connection, an electronic device which performs a station (STA) role may transmit a TWT request, and an electronic device which performs an access point (AP) role may transmit a TWT response. According to an embodiment of the disclosure, a device for transmitting a TWT request and a device for transmitting a TWT response may be changed according to a role in a wireless connection between the electronic device 101 and the display device 201.

For example, the electronic device 101 may set a device which performs an AP role a device which performs a STA role among the electronic device 101 and the display device 201 by differently setting a subfield of a request type 737 or 747 included in the TWT request 701 or the TWT response 703. For example, (c) in FIG. 7B may be a request type field format of an individual TWT parameter set field ((a) in FIG. 7B) according to IEEE 802.11ax. If a TWT request 751 among subfields of the request type 737 is set to 1, it may indicate a STA which performs TWT requesting or a TWT scheduled-STA. Alternatively, if the TWT request 751 among the subfields of the request type 737 is set to 0, it may indicate a STA which performs TWT responding or an STA which performs TWT scheduling. For another example, (d) in FIG. 7B may be a request type field format of a broadcast TWT parameter set field ((b) in FIG. 7B) according to IEEE 802.11ax. If a TWT request 761 among subfields of the request type 747 is set to 1, it may indicate an STA which performs TWT requesting or a TWT scheduled-STA. Alternatively, if a TWT request 751 among the subfields of the request type 737 is set to 0, it may indicate an STA which performs TWT responding or an STA which performs TWT scheduling.

Meanwhile, it has been illustrated that the electronic device 101 transmits a trigger frame and the display device 201 transmits a PS-Poll frame when a service period starts, however, an operation of transmitting the trigger frame and/or the PS-Poll frame may be omitted according to a value of a "Trigger" sub-field and a "Flow Type" sub field transmitted and/or received upon TWT setup.

For still another example, the electronic device 101 may transmit a TWT response (e.g., an unsolicited TWT response) without an operation of receiving a TWT request. For example, the electronic device 101 may transmit a TWT response including (a) or (b) in FIG. 7B to the display device 201. An individual TWT parameter set field or a broadcast TWT parameter set field may be included in the TWT response 703, so target wake time, nominal minimum TWT wake duration, and TWT wake interval mantissa information may be included in the TWT response 703. For example, if a TWT setup command sub-field of a Request Type in the TWT request 701 received from the display device 201 by the electronic device 101 is set to 0, a parameter value included in the TWT request 701 may be ignored. For example, if a TWT setup command 753 included in the Request Type 737 of the TWT request 701 or a TWT setup command 763 included in a Request Type 747 is set to 0, a parameter value included in the TWT request may be ignored.

In this case, the electronic device 101 may set target wake time, nominal minimum TWT wake duration, and TWT wake interval mantissa to transmit the TWT response 703 to the display device 201. For example, if the TWT setup command 753 included in the Request Type 737 of the TWT response 703 or the TWT setup command 763 included in the Request Type 747 of the TWT response 703 is set to 4, a parameter value included in a TWT request may be accepted and used. If a TWT setup command sub-field of the Request Type of the TWT request 701 is set to 0, even though the TWT setup command sub-field of the TWT response 703 is set to 4, TWT setup may be performed based on a parameter value included in the TWT response 703. For still another example, the electronic device 101 may set a sub-field of a Request Type of the TWT response 703 to 5 or 6, set the target wake time, the nominal minimum TWT wake duration, and the TWT wake interval mantissa, and transmit a TWT response to the display device 201. Specifically, the electronic device 101 may set a TWT setup command 753 field among the sub-fields of the Request Type 735 to 5 or 6. If the TWT setup command 753 field among the sub-fields of the Request type of the TWT response 703 is set to 5 or 6, a parameter value included in the TWT request received from the display device 201 may be set as a new parameter.

In other words, the electronic device 101 may set a communication cycle (wireless scheduling setting) and may notify the display device 201 of setting information of the communication cycle. As the electronic device 101 transmits the setting information of the communication cycle by using a TWT protocol, the display device 201 may identify a change in a frame rate without additional information.

Meanwhile, the information about the communication cycle is not limited to the above-described standard, and there is no limitation as long as the information about the communication cycle includes information about a start time point of a service period, maintenance time of the service period, and a cycle at which the service period is started. According to an embodiment of the disclosure, the electronic device 101 and the display device 201 may determine information about the start time point of the service period, the maintenance time of the service period, and the cycle at which the service period is started through negotiation. For example, if the display device 201 transmits, to the electronic device 101, setting information (e.g., information about a start time point of a service period, maintenance time of the service period, and a cycle at which the service period is started) of a communication cycle, the electronic device 101 may approve the setting of the communication cycle or transmit, to the display device 201, setting information of a communication cycle which is supportable in the electronic device 101 based on utilization of a channel (e.g., a first channel) and state information of the electronic device 101.

According to various embodiments of the disclosure, in operation 611, the electronic device 101 may receive a response from the display device 201. For example, the electronic device 101 may receive, from the display device 201, a response (e.g., ack) indicating that the display device 201 has received the TWT request or the TWT response.

According to various embodiments of the disclosure, in operation 613, the electronic device 101 may transmit a data frame to the display device 201 based on a communication cycle which corresponds to a changed frame rate. For example, if a frame rate is changed from 120 fps to 60 fps, the electronic device 101 may transmit a data frame to the display device 201 based on a cycle changed from 8.3 ms to 16.6 ms.

Figure 8:
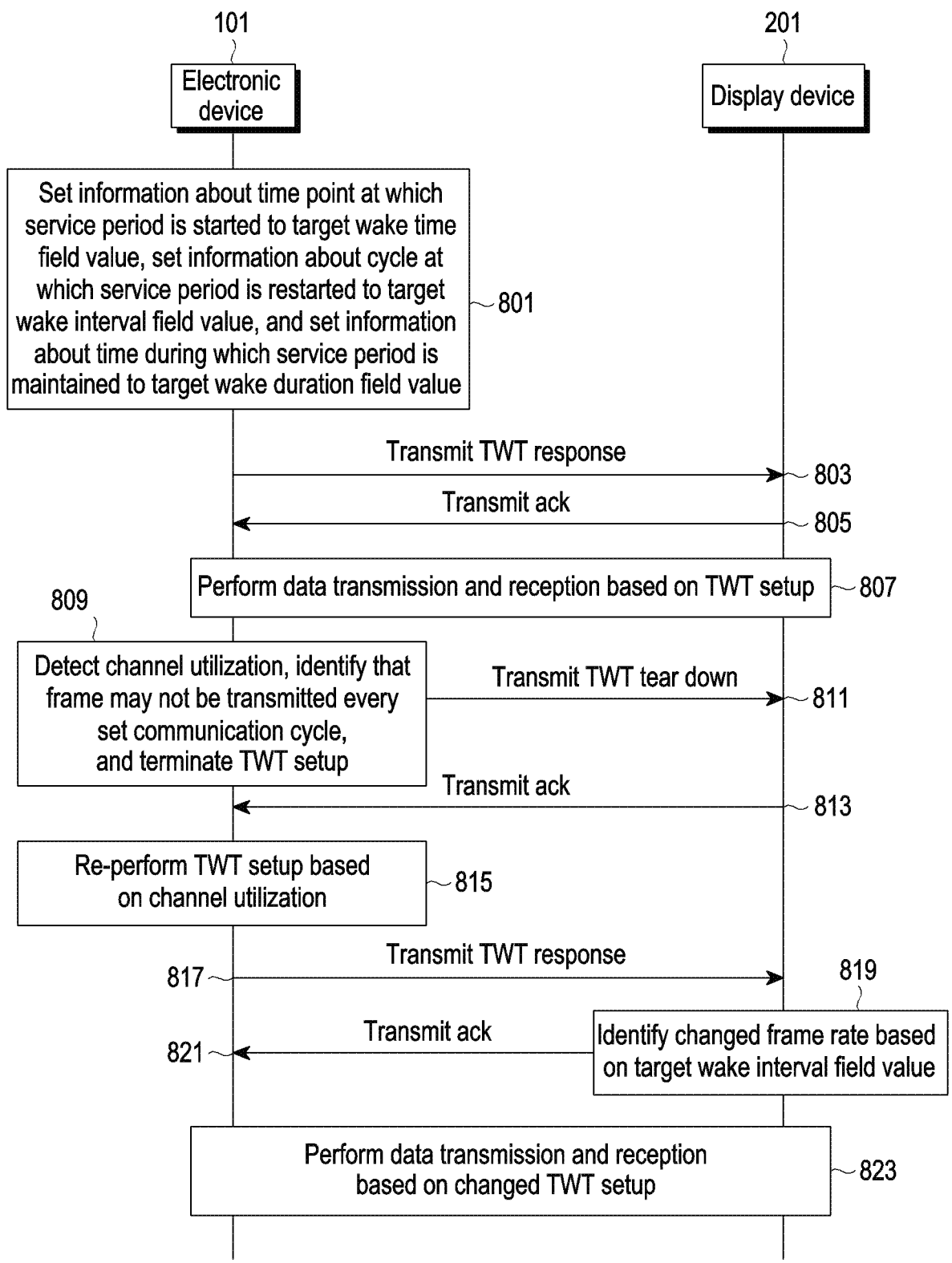
FIG. 8 is a flowchart illustrating an operation of an electronic device and a display device according to an embodiment of the disclosure.

FIG. 8 is a flowchart illustrating an operation of an electronic device and a display device according to an embodiment of the disclosure.

Referring to FIG. 8, in operation 801, an electronic device 101 (e.g., an electronic device 101 in FIG. 1) may set information about a time point at which a service period is started to a target wake time field value, set information about a cycle at which the service period is restarted to a target wake interval field value, and set information about time during which the service period is maintained to a target wake duration field value.

According to various embodiments of the disclosure, in operation 803, the electronic device 101 may transmit a TWT response to a display device 201 (e.g., a display device 201 in FIG. 2A). The TWT response may include a target wake time field, a target wake interval field, and a target wake duration field.

According to various embodiments of the disclosure, in operation 805, the display device 201 (e.g., the display device 201 in FIG. 2A) may transmit a response (e.g., ack) to a target response.

According to various embodiments of the disclosure, in operation 807, the electronic device 101 and the display device 201 may perform data transmission/reception based on TWT setup. The TWT setup may be based on the time point at which the service period is set, the cycle at which the service period is restarted, and the time during which the service period is maintained which the electronic device 101 sets in operation 801. For example, the electronic device 101 may transmit a data frame to the display device 201 during a service period of the display device 201. For example, the display device 201 may transmit, to the electronic device 101, screen information, sensor information, and/or photographing information during the service period.

According to various embodiments of the disclosure, in operation 809, the electronic device 101 may detect channel utilization, identify that a frame may not be transmitted every set communication cycle, and identify that there is a need for re-performing TWT setup. If an interval which the electronic device 101 and the display device 201 may occupy is shorter than the service period as channel utilization of a channel used by the electronic device 101 and the display device 201 increases, the electronic device 101 may identify that the electronic device 101 is incapable of transmitting a frame every set communication cycle. For example, an increase in channel utilization may mean that another device (for example, 211, 213, or 215 in FIG. 2B) with a high priority is identified in a channel through which the electronic device 101 and the display device 201 communicate. For another example, an increase in channel utilization may mean that other devices (e.g., 203 and 205 in FIG. 2A) which use a channel through which the electronic device 101 and the display device 201 communicate are identified. According to an embodiment of the disclosure, the electronic device 101 may identify that channel utilization increases based on detection of other devices while communicating with the display device 201 or waiting for a communication with the display device 201.

According to various embodiments of the disclosure, in operation 811, the electronic device 101 may transmit a TWT tear down to the display device 201. According to various embodiments of the disclosure, in operation 813, the display device 201 may transmit a response (e.g., ack) to the TWT tear down. Upon receiving the TWT tear down, the display device 201 may terminate a TWT operation without performing an operation of transitioning into a sleep state (i.e., a doze state) according to TWT setup. Meanwhile, if TWT parameters (e.g., a target wake time field, a target wake interval field, and a target wake duration field) are changed without terminating the TWT operation, operations 811 and 813 may be omitted.

According to various embodiments of the disclosure, in operation 815, the electronic device 101 may re-perform the TWT setup based on channel utilization of a channel. For example, the electronic device 101 may set changed information about a time point at which the service period is started to a target wake time field value, changed information about a cycle at which the service period is restarted to a target wake interval field value, and changed information about time during which the service period is maintained to a target wake duration field value. The electronic device 101 may change a frame rate provided in the display device 201 based on the channel utilization of the channel used by the electronic device 101 and the display device 201. In operation 807, the electronic device 101 may change the frame rate to a frame rate less than a frame rate provided to the display device 201 and may not change the service period. For example, in operation 815, the target wake interval field value may be changed, and the target wake duration field value may be maintained. For example, in operation 815, the electronic device 101 may set information (e.g., target wake time) about a time point at which a changed or newly set cycle value (e.g., a target wake interval field), at which the service period is restarted, will be applied. According to various embodiments of the disclosure, in operation 817, the electronic device 101 may transmit a TWT response to the display device 201. The TWT response may include a target wake time field, a target wake interval field, and a target wake duration field set in operation 815.

According to various embodiments of the disclosure, in operation 819, the display device 201 may identify a changed frame rate based on a target wake interval field value. The target wake interval field value means a cycle at which the service period is repeated, the display device 201 may identify the changed frame rate by using the target wake interval field value. Accordingly, the display device 201 may identify the changed frame rate based on a TWT response without separately receiving information about a frame rate.

According to various embodiments of the disclosure, in operation 821, the display device 201 may transmit a response (e.g., ack) to the target response.

According to various embodiments of the disclosure, in operation 823, the electronic device 101 and the display device 201 may perform data transmission/reception based on changed TWT setup information. The TWT setup information may be based on the time point at which the service period is started, the cycle at which the service period is re-started, and the time during which the service period is maintained which are set by the electronic device 101 in operation 815. For example, the electronic device 101 may transmit a data frame to the display device 201 during the service period of the display device 201. For example, the display device 201 may transmit screen information, sensor information, and/or photographing information to the electronic device 101 during the service period.

Figure 9A:
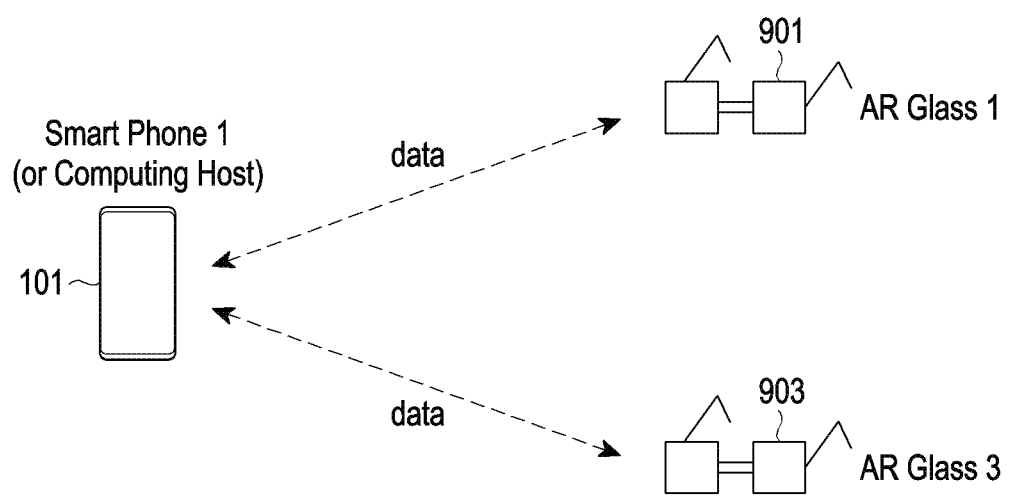
FIG. 9A is a diagram illustrating an environment where an electronic device and a plurality of display devices exist according to an embodiment of the disclosure.
Figure 9B:
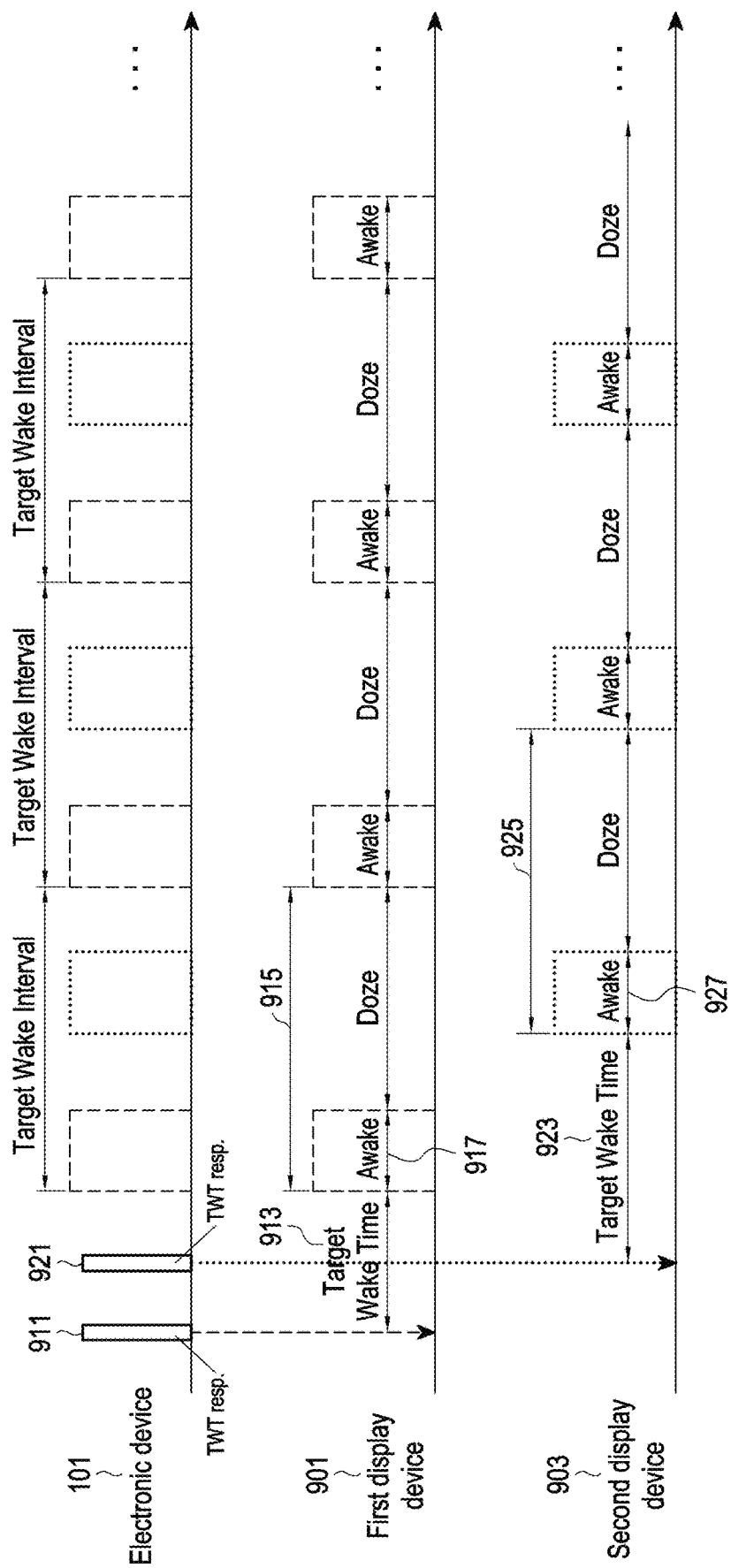
FIG. 9B is a diagram illustrating an operating method of an electronic device according to an embodiment of the disclosure.
Figure 9C:
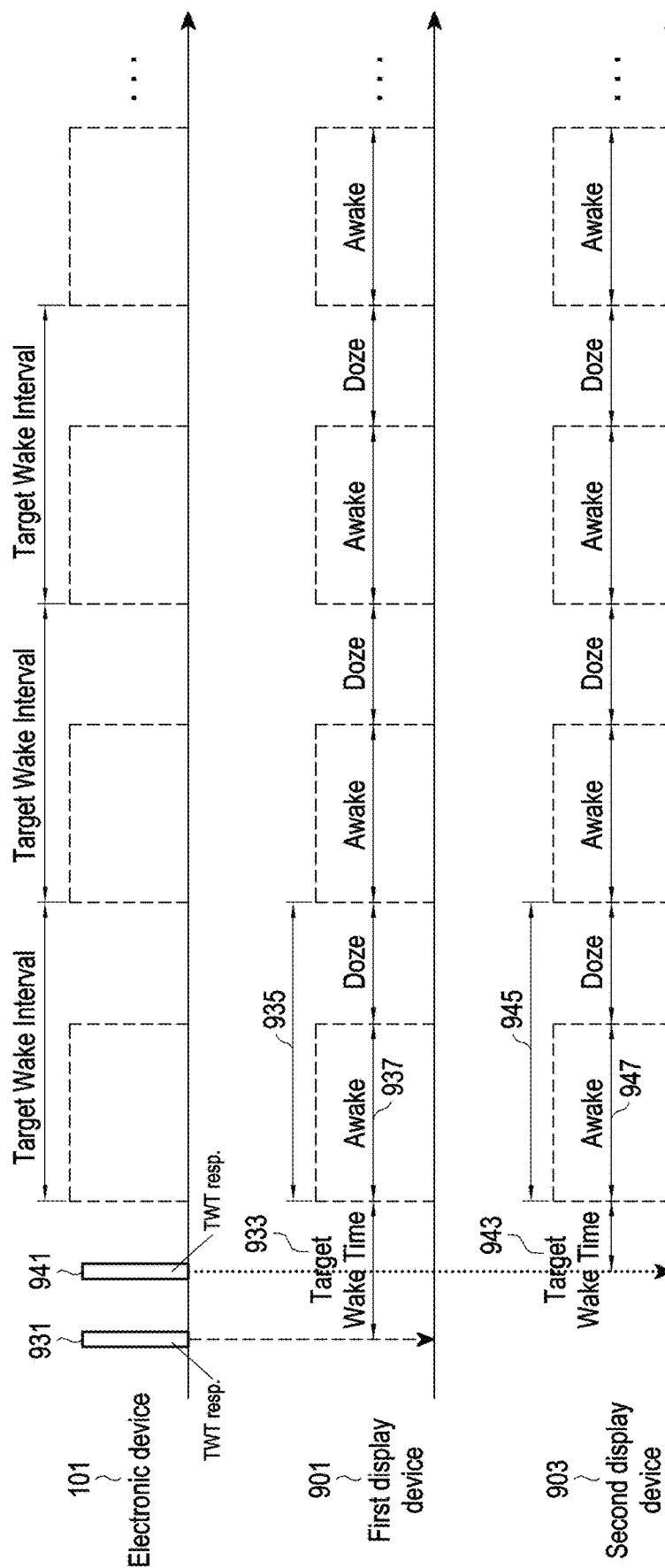
FIG. 9C is a diagram illustrating an operating method of an electronic device according to an embodiment of the disclosure.

FIG. 9A is a diagram illustrating an environment where an electronic device and a plurality of display devices exist according to an embodiment of the disclosure. FIG. 9B is a diagram for illustrating an operating method of an electronic device according to an embodiment of the disclosure. FIG. 9C is a diagram illustrating an operating method of an electronic device according to an embodiment of the disclosure.

Referring to FIG. 9A, an electronic device 101 (e.g., an electronic device 101 in FIG. 1) may perform a communication by using the same channel as a first display device 901 (e.g., a display device 201 in FIG. 2A) and a second display device 903 (e.g., a display device 201 in FIG. 2A). If a frame rate provided in the first display device 901 and a frame rate provided in the second display device 903 are the same, a communication cycle at which the electronic device 101 transmits a data frame to each of the display devices 901 and 903 may be the same. The electronic device 101 may transmit data to all of the first display device 901 and the second display device 903 within one communication cycle. At this time, the electronic device 101 may differently allocate time or frequency resource which corresponds to the first display device 901 and the second display device 903 to transmit data to all of the first display device 901 and the second display device 903 within one communication cycle. For example, the electronic device 101 may transmit data to all of the first display device 901 and the second display device 903 within one communication cycle by equally allocating a cycle value (e.g., target wake interval field) at which the service period is re-started to the first display device 901 and the second display device 902, and differently allocating time which corresponds to the first display device 901 and the second display device 902 by differently setting information (e.g., target wake time) about a time point to be applied. For another example, the electronic device 101 may transmit data to all of the first display device 901 and the second display device 903 within one communication cycle by equally allocating information (e.g., target wake time) about a time point at which a cycle value (e.g., target wake interval field) at which the service period is restarted will be applied to the first display device 901 and the second display device 902, and differently allocating a frequency resource to the first display device 901 and the second display device 902.

According to various embodiments of the disclosure, the electronic device 101 may allocate different time to each of the first display device 901 and the second display device 903 to transmit data to each of the first display device 901 and the second display device 903. Referring to FIG. 9B, the electronic device 101 may transmit a first TWT response 911 to the first display device 901. The first TWT response 911 may include a first target wake time 913 field, a first target wake interval 915 field, and a first target wake duration 917 field. After receiving the first TWT response 911, the first display device 901 may maintain an awake state during a first target wake duration 917 after first target wake time 913 has elapsed, transition into a doze state after the first target wake duration 917 has elapsed, and an awake state and a doze state may be repeated at a cycle of a first target wake interval 915. For example, the electronic device 101 may transmit a second TWT response 921 to the second display device 902. The second TWT response 921 may include a second target wake time 923 field, a second target wake interval 925 field, and a second target wake duration 927 field. After receiving the second TWT response 921, the second display device 903 may maintain an awake state during a second target wake duration 927 after second target wake time 923 has elapsed, transition into a doze state after the second target wake duration 927 has elapsed, and an awake state and a doze state may be repeated at a cycle of a second target wake interval 925. Assuming that a frame rate provided in the first display device 901 and a frame rate provided in the second display device 903 are the same, the first target wake interval 915 and the second target wake interval 925 may be the same. During the first target wake duration 917, the electronic device 101 transmits a data frame only to the first display device 901, so the electronic device 101 may maintain the first target wake duration 917 which is the same as a case that only the electronic device 901 and the first display device 901 use one channel. In other words, by setting a service period of the first display device 901 and a service period of the second display device 903 to be different, the electronic device 101 may transmit a data frame to each of the first display device 901 and the second display device 903 without collision or delay. According to an embodiment of the disclosure, by setting the target wake intervals 915 and 925 to be the same and setting the target wake durations 917 and 927 to be the same, and setting the target wake times 913 and 923 to be different, the electronic device 901 may transmit a data frame to the plurality of devices 901 and 903 without collision or delay. According to an embodiment of the disclosure, the electronic device 901 may determine the number of display devices to which the electronic device 901 may transmit a data frame based on the number of target wake durations (e.g., 917 and 927) which may be included in the target wake intervals (e.g., 915 and 925).

According to various embodiments of the disclosure, by differently allocating a frequency resource (e.g., an OFDMA scheme) or differently allocating a spatial beam resource (e.g., an MU-MIMO scheme) to each of the first display device 901 and the second display device 903, the electronic device 101 may transmit data to each of the first display device 901 and the second display device 903. For example, assuming that a service period is 2 ms if the electronic device 101 uses one channel with the first display device 901, a service period may be 4 ms if the electronic device 101 transmits a data frame by allocating different frequency resource or spatial beam resource at the same time as the first display device 901 and the second display device 903. Referring to FIG. 9C, the electronic device 101 may transmit a first TWT response 931 to the first display device 901. The first TWT response 931 may include a first target wake time 933 field, a first target wake interval 935 field, and a first target wake duration 937 field. After receiving the first TWT response 931, the first display device 901 may maintain an awake state during a first target wake duration 937 after first target wake time 933 has elapsed, transition into a doze state after the first target wake duration 937 has elapsed, and an awake state and a doze state may be repeated at a cycle of a first target wake interval 935. Referring to FIG. 9C, the electronic device 101 may transmit a second TWT response 941 to the second display device 903. The second TWT response 941 may include a second target wake time 943 field, a second target wake interval 945 field, and a second target wake duration 947 field. After receiving the second TWT response 941, the second display device 903 may maintain an awake state during a second target wake duration 947 after second target wake time 943 has elapsed, transition into a doze state after a second target wake duration 947 has elapsed, and an awake state and a doze state may be repeated at a cycle of a second target wake interval 945. A different frequency resource or spatial beam resource is allocated to the first display device 901 and the second display device 903 during the same time, so a time point at which a service period is started, a service period, and a cycle at which the service period is repeated may be the same. In other words, the electronic device 101 may transmit a data frame to each of the first display device 901 and the second display device 903 without collision or delay by setting a service period of the first display device 901 and a service period of the second display device 903 to be the same and differently allocating a frequency resource or spatial beam resource to the first display device 901 and the second display device 903.

Figure 10:
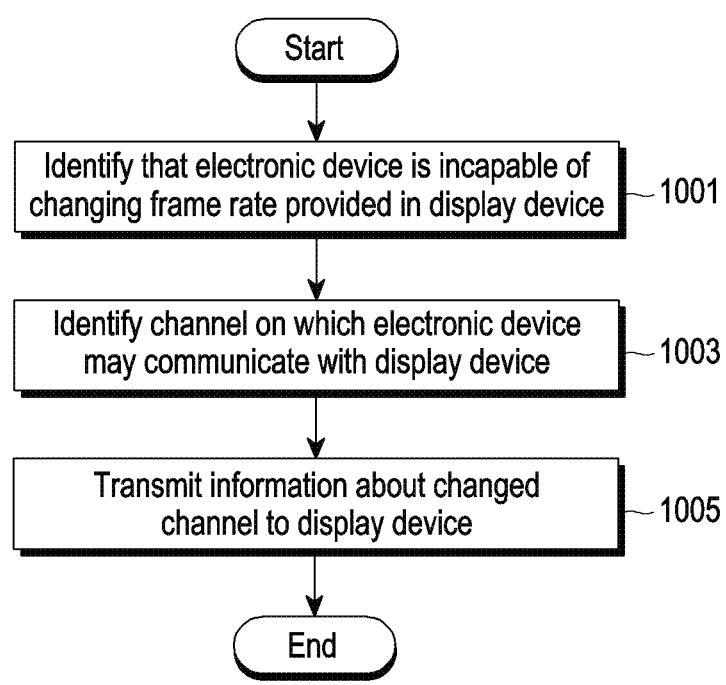
FIG. 10 is a flowchart illustrating an operation of an electronic device according to an embodiment of the disclosure.

FIG. 10 is a flowchart illustrating an operation of an electronic device according to an embodiment of the disclosure.

Referring to FIG. 10, in operation 1001, an electronic device 101 (e.g., an electronic device 101 in FIG. 1) may identify that the electronic device 101 is incapable of changing a frame rate provided in a display device (e.g., a display device 201 in FIG. 2A). The electronic device 101 may identify whether a frame rate may be changed according to an application which is run based on a connection with the display device 201. For example, for a case that a high frame rate is set for natural screen switching, such as a game application, the electronic device 101 may set the frame rate to be unchangeable.

According to various embodiments of the disclosure, in operation 1003, the electronic device 101 may identify a channel on which the electronic device 101 may communicate with the display device 201. If it is difficult to transmit a data frame every communication cycle which corresponds to a current frame rate according to channel utilization of a channel used by the electronic device 101, and it is impossible to change the frame rate, the electronic device 101 may identify an available channel. For example, if it is determined that the data frame may be transmitted every communication cycle which corresponds to the current data frame based on channel information about another channel, a change to the other channel may be performed. For example, the electronic device 101 may measure channel utilization of another channel in an interval in which the display device 201 is in a doze state and identify a channel through which a data frame may be transmitted every communication cycle which corresponds to the current frame rate.

According to various embodiments of the disclosure, in operation 1005, the electronic device 101 may transmit information about a changed channel to a display device 201. According to an embodiment of the disclosure, the electronic device 101 may transmit, to the display device 201, information for requesting a channel change. According to another embodiment of the disclosure, the electronic device 101 may transmit, to the display device 201, the information about the changed channel through an 00B. For example, while performing a communication with the display device 201 through a Wi-Fi network, the electronic device 101 may transmit, to the display device 201, information about another channel to be desired to change by using a frequency of a band (e.g., BLE) other than the Wi-Fi network. Accordingly, the electronic device 101 and the display device 201 may change a channel through which the electronic device 101 and the display device 201 communicate without delay.

Figure 11:
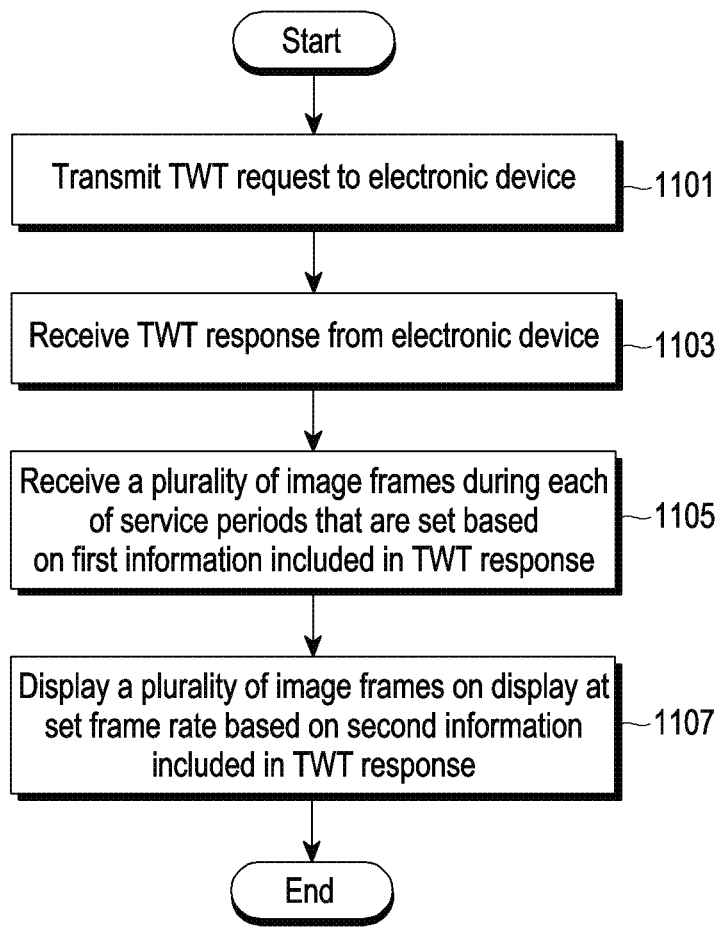
FIG. 11 is a flowchart illustrating an operation of a display device according to an embodiment of the disclosure.

FIG. 11 is a flowchart illustrating an operation of a display device according to an embodiment of the disclosure. An order of operations in FIG. 11 is not limited, and another operation may be further performed between two adjacent operations. In addition, at least some of the operations in FIG. 11 may be omitted, and the above description may be equally applied to an entire flowchart of the disclosure. In the disclosure, an expression that a display device 201 performs a designated operation may mean that a processor 311 of the display device 201 performs the designated operation and the processor 311 controls another hardware to perform the designated operation.

Referring to FIG. 11, in operation 1101, the display device 201 (e.g., a display device 201 in FIG. 2A) may transmit a TWT request to the electronic device 101 (e.g., an electronic device 101 in FIG. 1). The display device 201 may transmit, to the electronic device 101, the TWT request including a target wake time field, a target wake duration field, and a target wake interval field.

According to various embodiments of the disclosure, in operation 1103, the display device 201 may receive a TWT response from the electronic device 101. The TWT response may include a target wake time field, a target wake duration field, and a target wake interval field set by the electronic device 101. Meanwhile, the display device 201 may receive the TWT response from the electronic device 101 without transmitting the TWT request. So, operation 1101 may be omitted.

According to various embodiments of the disclosure, in operation 1105, the display device 201 may receive and display a plurality of image frames during each of service periods which are set based on first information included in the TWT response. The display device 201 may set a service period which corresponds to a target wake duration field value included in the TWT response, start a service period at a time point which corresponds to a target wake time field value, and receive an image frame during the service period. At this time, the service period may be repeated at a cycle which corresponds to a target wake interval field value.

According to various embodiments of the disclosure, in operation 1107, the display device 201 may display a plurality of image frames on a display at a set frame rate based on second information included in the TWT response received from the electronic device 101. The TWT response may include the second information including a target wake interval field set by the electronic device 101.

According to various embodiments of the disclosure, in operation 1107, the display device 201 may receive and display a plurality of image frames during each of service periods which are set based on the second information included in the TWT response. The display device 201 may receive a plurality of image frames from the electronic device 101 at a set frame rate and display the plurality of image frames on a display. The display device 201 may identify a frame rate at which the display device 201 displays an image based on a target wake interval field value. The display device 201 may display the plurality of image frames at the identified frame rate. For example, if it is identified that a cycle of a service period is 8.3 ms by the target wake interval field value, the frame rate is set to 120 fps (=1 frame/8.3 ms), and 120 frames per second may be displayed.

Heat generation of an electronic device or heat generation of a display device which occurs upon data transmission and reception during a data communication needs to be limited within a predetermined temperature range, in the following description, such a heat generation control method will be described below.

According to various embodiments of the disclosure, one of methods for reducing a heat generation temperature is to control an application or an operation of a process upon data transmission/reception to reduce a temperature. According to an embodiment of the disclosure, if an electronic device heats up, the electronic device may control to reduce a frame rate upon data transmission/reception. According to an embodiment of the disclosure, if a display device heats up, the display device may reduce a frame rate itself to reduce a temperature. According to an embodiment of the disclosure, if the display device heats up, the display device may notify the electronic device of a heat generation state of the display, so the electronic device may reduce a frame rate upon data transmission/reception.

First, a method of controlling heat generation in an electronic device 101 for reducing a temperature if the electronic device 101 heats up will be described with reference to FIGS. 12A and 12B.

Figure 12A:
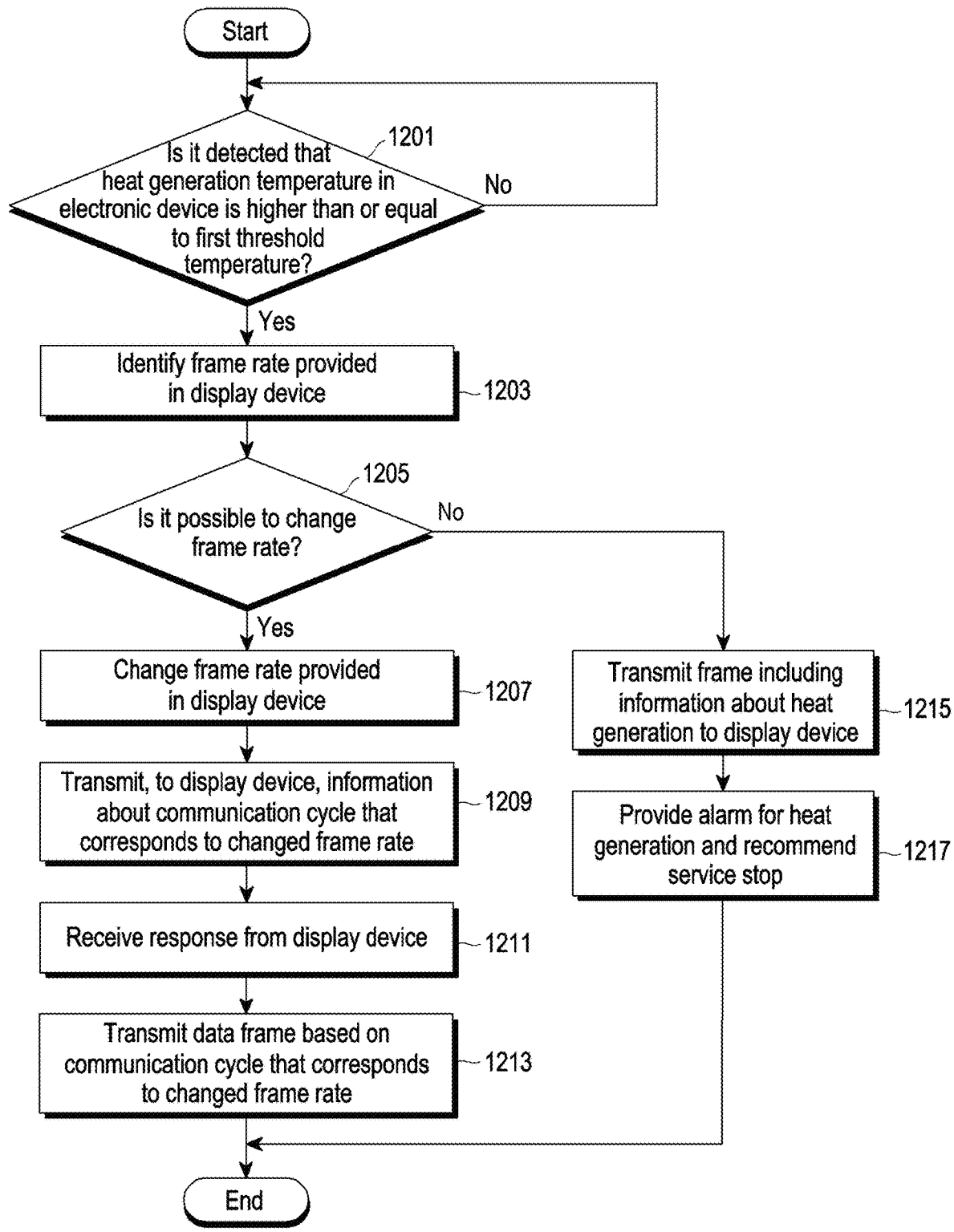
FIG. 12A is a flowchart illustrating an operation of an electronic device upon heat generation according to an embodiment of the disclosure.

FIG. 12A is a flowchart illustrating an operation of an electronic device upon heat generation according to an embodiment of the disclosure.

According to various embodiments of the disclosure, upon detecting that a heat generation state in which a temperature is higher than or equal to a predetermined temperature, an electronic device 101 may perform an operation for controlling heat generation. According to an embodiment of the disclosure, the electronic device 101 may detect a heat generation state in which a temperature is higher than or equal to a threshold temperature after a communication connection with a display device 201, and change a frame rate provided in the display device 201 corresponding to the heat generation state.

Referring to FIG. 12A, in operation 1201, the electronic device 101 (e.g., an electronic device 101 in FIG. 1) may detect whether a heat generation temperature in the electronic device 101 is higher than or equal to a first threshold temperature. According to an embodiment of the disclosure, the electronic device 101 may be in a wireless communication connection state with the display device 201 (e.g., a display device 201 in FIG. 2A), and may monitor whether the electronic device 101 heats up by continuously measuring a temperature according to a designated cycle or during a data communication (e.g., a Wi-Fi communication).

According to an embodiment of the disclosure, the first threshold temperature may be a preset reference temperature to determine whether the electronic device 101 heats up. For example, whether the electronic device 101 heats up may be determined based on not only a temperature detected from an antenna within the electronic device 101 or a temperature sensor disposed around a communication circuit, but also a temperature detected from a processor (e.g., an application processor (AP)) (e.g., a processor 120 in FIG. 1), and types of components related to a main heat source of the Wi-Fi communication may not be limited thereto. For example, the electronic device 101 may monitor whether the electronic device 101 heats up based on a temperature measurement result from a temperature sensor disposed adjacent to various components such as a Wi-Fi module (not shown).

In an embodiment of the disclosure, if a detected heat generation temperature in the electronic device 101 is higher than or equal to the first threshold temperature, the electronic device 101 may identify a frame rate provided in the display device 201 in operation 1203. According to an embodiment of the disclosure, if the detected heat generation temperature in the electronic device 101 is higher than or equal to the first threshold temperature, the electronic device 101 may perform an operation of reducing a frame rate as one of operations for controlling heat generation. For example, the electronic device 101 may identify what frame rate is transmitted to the display device 201.

Based on the identification of the frame rate, the electronic device 101 may identify whether the frame rate may be changed in operation 1205. For example, if the electronic device 101 heats up, the electronic device 101 may identify whether a current frame rate may be changed based on an application or service which is run in the electronic device 101 and the display device 201. For example, a game application is based on real-time transmission of large-capacity data for a natural screen, so it may not be possible to change a frame rate. However, in a case of a video application, it may be possible to adjust a frame rate through a change in image quality.

If it is determined that the change in the frame rate is not possible in operation 1205, the electronic device 101 may transmit a frame including information about heat generation to the display device 201 in operation 1215. For example, the electronic device 101 may cause the display device 201 to recognize a heat generation state of the electronic device 101 by transmitting the frame including the information about the heat generation.

In operation 1217, the electronic device 101 may provide an alarm for the heat generation and recommend a service stop. For example, the electronic device 101 may display a message warning that the electronic device 101 may be damaged due to the heat generation or may output an alarm sound. In addition, the electronic device 101 may cause the display device 201 to display the message recommending the service stop due to the heat generation or to output the alarm sound by transmitting the frame including the information about the heat generation to the display device 201.

Meanwhile, operations 1207 to 1213 in FIG. 12A correspond to operations 607 to 613 in FIG. 6, and descriptions thereof are as follows.

If the electronic device 101 determines that the frame rate may be changed in operation 1205, the electronic device 101 may change the frame rate provided in the display device 201 in operation 1207. For example, the electronic device 101 may change the frame rate transmitted to the display device 201 from 120 bps to 60 bps. As the frame rate is changed, a communication cycle may be changed from 8.3 ms to 16.6 ms.

In operation 1209, the electronic device 101 may transmit, to the display device 201, information about a communication cycle which corresponds to the changed frame rate. For example, the information about the communication cycle may include information about a time point at which a service period starts, information about time during which the service period is maintained, and information about a cycle at which the service period is restarted. The electronic device 101 may transmit the information about the communication cycle by using a TWT protocol. For example, the electronic device 101 may transmit, to the display device 201, a TWT response or a TWT request including the information about the communication cycle.

In response to transmitting the information about the communication cycle, the electronic device 101 may receive a response from the display device 201 in operation 1211. In response to the response, the electronic device 101 may transmit a data frame based on the communication cycle which corresponds to the changed frame rate in operation 1213.

As described above, according to various embodiments of the disclosure, if a heat generation situation occurs in the electronic device 101, damage to the electronic device 101 due to heat generation may be prevented by reducing a frame rate for controlling the heat generation or warning the heat generation situation.

Meanwhile, after the frame rate is reduced, the heat generation situation may be released. So, if the frame rate is restored to its original state in a normal state in which the heat generation situation is released, the electronic device 101 and the display device 201 may provide an optimal application or service.

Hereinafter, an operation in a case that a heat generation situation is released after a frame rate is adjusted due to heat generation in an electronic device 101 will be described with reference to FIG. 12B.

Figure 12B:
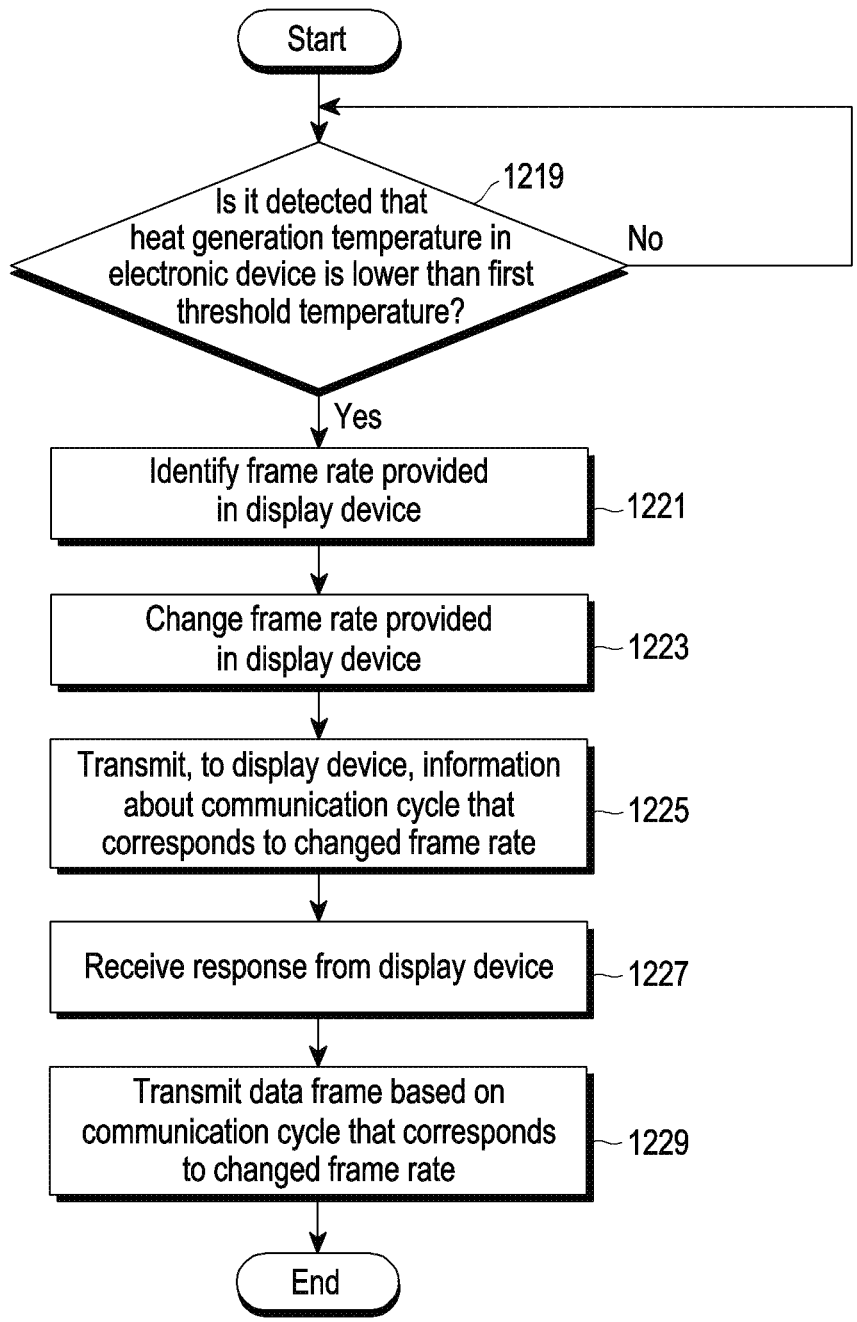
FIG. 12B is a flowchart illustrating an operation of an electronic device in a case that heat generation is reduced according to an embodiment of the disclosure.

FIG. 12B is a flowchart illustrating an operation of an electronic device in a case that heat generation is reduced according to an embodiment of the disclosure. For example, FIG. 12B may illustrate an operation after an electronic device 101 detects a heat generation situation, and transmits, to a display device 201, a data frame based on a communication cycle which corresponds to a changed frame rate in FIG. 12A.

Referring to FIG. 12B, after occurrence of heat generation, the electronic device 101 may detect whether a heat generation temperature in the electronic device 101 is lower than a first threshold temperature in operation 1219. According to an embodiment of the disclosure, the first threshold temperature may be a preset reference temperature for determining whether the electronic device 101 heats up. For example, a heat generation temperature may be reduced due to a change in a frame rate after the occurrence of heat generation, so the electronic device 101 may monitor whether the heat generation temperature decreases below the first threshold temperature after the occurrence of the heat generation.

According to an embodiment of the disclosure, the electronic device 101 may monitor a heat generation temperature according to a preset measurement cycle while transmitting a data frame based on a communication cycle which corresponds to a changed frame rate. Here, the measurement cycle for monitoring the heat generation temperature may be adjustable. For example, even if a frame rate is changed (e.g., reduced), an elevated temperature is not immediately reduced, and the electronic device 101 may measure a temperature after preset time. For another example, the measurement cycle may be adjusted based on the measured temperature of the electronic device 101 or changed amount of the temperature.

According to an embodiment of the disclosure, after the occurrence of the heat generation, if the heat generation temperature of the electronic device 101 is not lower than the first threshold temperature in operation 1219, the electronic device 101 may perform an operation of transmitting a data frame based on a communication cycle which corresponds to the changed frame rate according to the occurrence of heat generation.

According to an embodiment of the disclosure, if the heat generation temperature in the electronic device 101 is lower than the first threshold temperature in operation 1219, the electronic device 101 may identify a frame rate (e.g., a current frame rate) provided in the display device 201 in operation 1221, and change the frame rate provided in the display device 201 in operation 1223. For example, the electronic device 101 may change a frame rate transmitted to the display device 201 from 60 bps to 120 bps as an original data rate. As the frame rate is changed, a communication cycle may be changed from 16.6 ms to 8.3 ms. In operation 1225, the electronic device 101 may transmit, to the display device 201, information about a communication cycle which corresponds to the changed frame rate. In response to transmission of the information about the communication cycle, the electronic device 101 may receive a response from the display device 201 in operation 1227. In response to the response, the electronic device 101 may transmit a data frame based on the communication cycle which corresponds to the changed frame rate in operation 1229.

According to an embodiment of the disclosure, the electronic device 101 may periodically monitor whether heat generation occurs while being connected to the display device 201. For example, in a state in which the connection is not released or transmission of the data frame is not terminated, the electronic device 101 may continuously monitor whether the heat generation occurs and whether a heat generation situation is released.

According to an embodiment of the disclosure, if a heat generation temperature is higher than or equal to the first threshold temperature at the measurement cycle for monitoring whether the heat generation occurs, but the heat generation temperature is reduced due to a change in a frame rate, the electronic device 101 may maintain the changed frame rate.

According to an embodiment of the disclosure, in the above description, it has been described that the frame rate transmitted to the display device 201 is changed from 120 bps to 60 bps in a heat generation state in which a temperature is higher than or equal to the first threshold temperature, however, the electronic device 101 may control heat generation by stepwise reducing the frame rate. For example, in a case that a heat generation temperature of the electronic device 101 is reduced below the first threshold temperature as the frame rate is changed from 120 bps to 60 bps, however, the heat generation temperature of the electronic device 101 is higher than or equal to a second threshold temperature, e.g., a temperature at which it is still likely to be damaged, the electronic device 101 may perform an operation to further reduce the frame rate transmitted to the display device 201 from 60 bps to 30 bps. According to an embodiment of the disclosure, the second threshold temperature may be lower than the first threshold temperature.

According to an embodiment of the disclosure, the electronic device 101 may control the heat generation situation in stages. For example, if the heat generation temperature is higher than the first threshold temperature, the electronic device 101 may control the heat generation situation in stages, for example, by changing the frame rate from 120 bps to 60 bps, checking the heat generation temperature again, and changing the frame rate from 60 bps to 30 bps.

According to another embodiment of the disclosure, if a heat generation situation, in which a temperature is significantly higher than the first threshold temperature, occurs, the electronic device 101 may control the heat generation situation by setting a changed width for the frame rate transmitted to the display device 201 to be large, for example, by changing the frame rate from 120 bps to 30 bps according to the set changed width in order that the heat generation temperature is significantly reduced.

As described above, a threshold temperature (e.g., a first threshold temperature and a second threshold temperature) or a threshold temperature range for each control operation may be adjusted, and the electronic device 101 may set a changed width for a frame rate according to a range to which a heat generation temperature belongs.

Hereinafter, a method of controlling heat generation in a display device 201 for reducing a temperature upon heat generation in the display device 201 will be described with reference to FIGS. 13A and 13B.

Figure 13A:
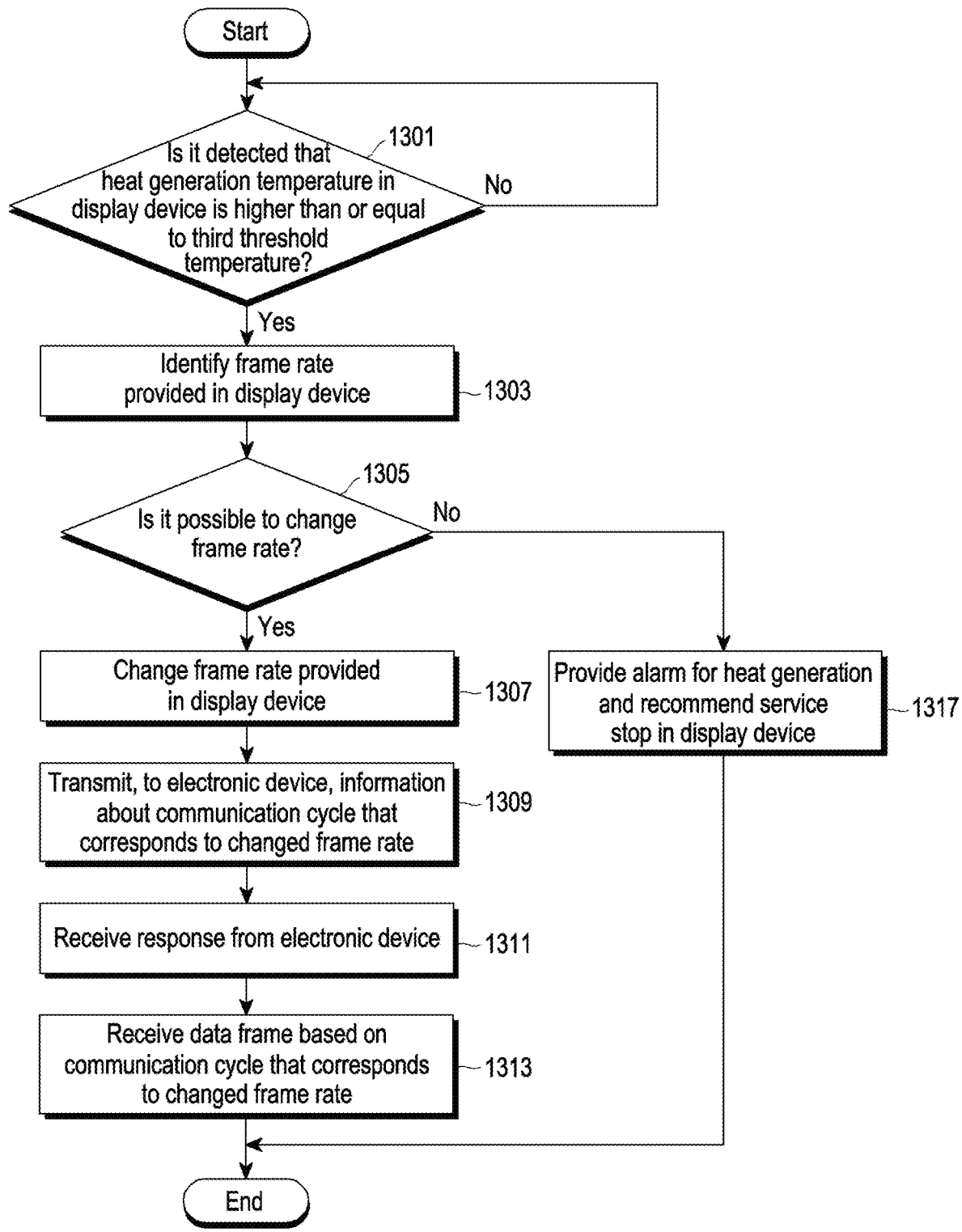
FIG. 13A is a flowchart illustrating an operation of a display device upon heat generation according to an embodiment of the disclosure.

FIG. 13A is a flowchart illustrating an operation of a display device upon heat generation according to an embodiment of the disclosure. Referring to FIG. 13A, according to various embodiments of the disclosure, a display device 201 (e.g., a display device 201 of FIG. 2A) may perform an operation for controlling heat generation when detecting a heat generation situation in which a temperature is higher than or equal to a predetermined temperature.

According to an embodiment of the disclosure, in operation 1301, the display device 201 may detect whether a heat generation temperature in the display device 201 is higher than or equal to a third threshold temperature. According to an embodiment of the disclosure, the third threshold temperature may be a preset reference temperature to determine whether the display device 201 heats up. For example, a reference temperature for determining whether the display device 201 heats up and a reference temperature for determining whether the electronic device 101 heats up may be different from each other. For example, in a case of the display device 201, a user wears the display device 201 on a face, so a reference temperature for determining whether the display device 201 heats up may be lower than a reference temperature for determining whether the electronic device 101, which is held in hands and used, heats up. However, this is only an example, and each of the reference temperatures may be the same.

According to an embodiment of the disclosure, the display device 201 may be in a wireless communication connection with the electronic device 101, and monitor whether the display device 201 heats up by continuously measuring a temperature according to a designated cycle or during a data communication (e.g., a Wi-Fi communication). For example, the display device 201 may measure quality of a received signal or channel complexity, and the display device 201 may self-monitor a heat generation situation.

According to an embodiment of the disclosure, when heat generation occurs, the display device 201 may provide the electronic device 101 with information related to heat generation in the display device 201, provide the electronic device 101 with the information related to the heat generation by using a control frame or a data frame, and obtain information related to heat generation in the electronic device 101.

In an embodiment of the disclosure, if a heat generation temperature in the display device 201 is higher than or equal to the third threshold temperature, the display device 201 may identify a frame rate (e.g., a current frame rate) provided in the display device 201 in operation 1303.

According to an embodiment of the disclosure, if the display device 201 is capable of changing the frame rate in operation 1305 based on a result of identifying the frame rate, the display device 201 may change the frame rate provided in the display device 201 in operation 1307. For example, the display device 201 may determine how and how much the frame rate may be changed by identifying a capability of the display device 201 based on a stored setting value, and change the frame rate based on this. For example, the display device 201 may change the frame rate from 120 bps to 60 bps in order to reduce a heat generation temperature. According to an embodiment of the disclosure, if a heat generation situation, in which a temperature is significantly higher than the third threshold temperature, occurs, the display device 201 may control the heat generation situation by setting a changed width for the frame rate to be large, for example, by changing the frame rate from 120 bps to 30 bps according to the set changed width in order that the heat generation temperature is significantly reduced.

In operation 1309, the display device 201 may transmit, to the electronic device 101, information about a communication cycle which corresponds to the changed frame rate. In response to transmitting the information about the communication cycle, the display device 201 may receive a response from the electronic device 101 in operation 1311. In response to the response, the display device 201 may receive a data frame based on the communication cycle which corresponds to the changed frame rate in operation 1313.

Meanwhile, if it is determined that the display device 201 is incapable of changing the frame rate based on the result of identifying the frame rate in operation 1305, the display device 201 may provide a notification about heat generation and recommend a service stop in operation 1317. For example, the display device 201 may display a message for warning that the display device 201 may be damaged due to heat generation or may output an alarm sound.

As described above, upon heat generation, the display device 201 may reduce a temperature by reducing a frame rate, so the reduced frame rate may be maintained, and a heat generation situation may be released while data is transported. In this case, the reduced frame rate may be maintained, however, the display device 201 may monitor the heat generation temperature and restore the frame rate from the reduced rate to an original frame rate (e.g., a frame rate before the heat generation) if the heat generation is released in order that an optimal application or service may be provided between the electronic device 101 and the display device 201.

Meanwhile, an operation in the display device 201 when a heat generation situation is released will be described with reference to FIG. 13B.

Figure 13B:
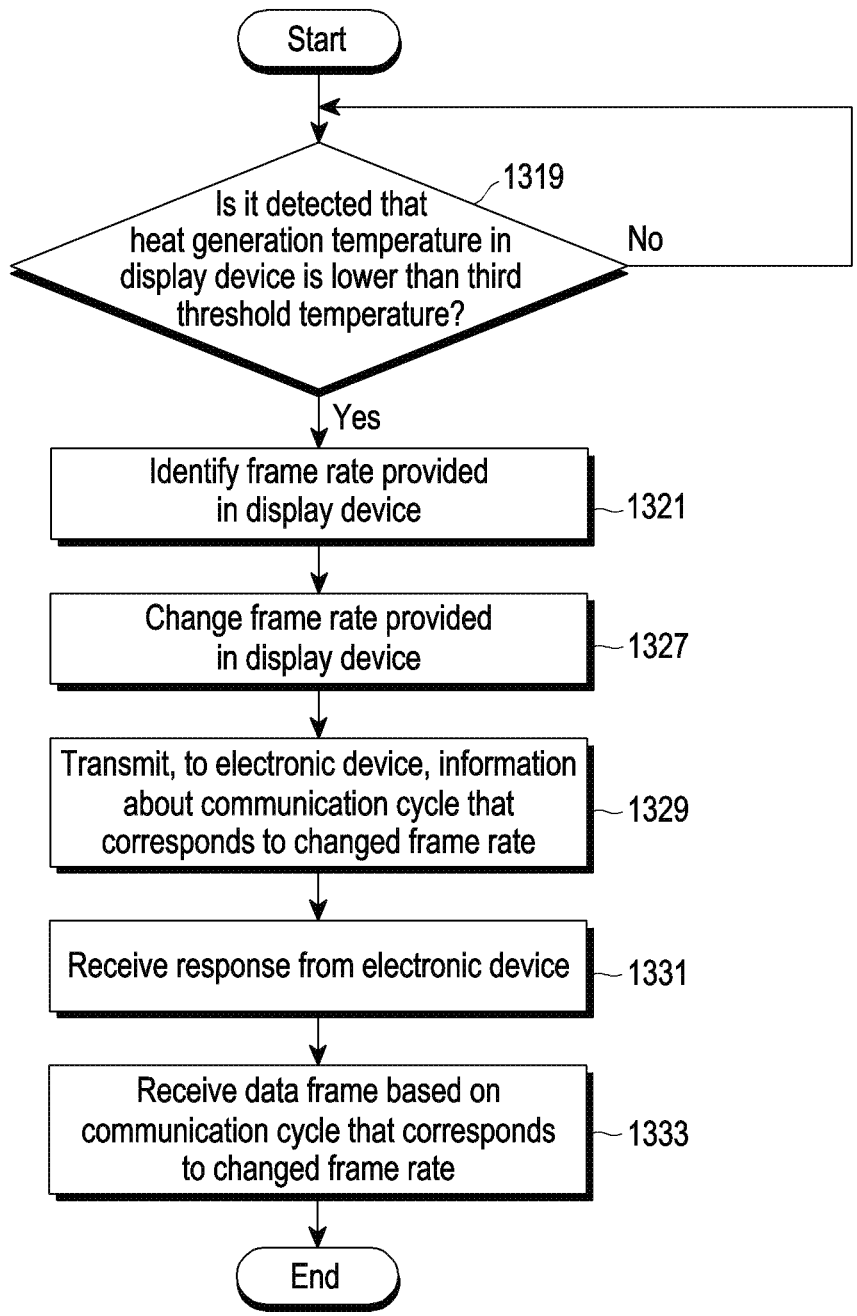
FIG. 13B is a flowchart illustrating an operation of a display device in a case that heat generation is reduced according to an embodiment of the disclosure.

FIG. 13B is a flowchart illustrating an operation of a display device in a case that heat generation is reduced according to an embodiment of the disclosure. For example, FIG. 13B may illustrate an operation after a display device 201 detects a heat generation situation, and receives, from an electronic device 101, a data frame based on a communication cycle which corresponds to a changed frame rate.

Referring to FIG. 13B, after heat generation occurs, the display device 201 may detect whether a heat generation temperature in the display device 201 is lower than a third threshold temperature in operation 1319. For example, the display device 201 may monitor the heat generation temperature according to a preset measurement cycle while receiving a data frame based on a communication cycle which corresponds to a frame rate changed according to the occurrence of the heat generation. In an embodiment of the disclosure, after the heat generation occurs, if the heat generation temperature in the display device 201 is not lower than the third threshold temperature in operation 1319, the display device 201 may perform an operation of receiving a data frame based on a communication cycle which corresponds to a frame rate changed according to the occurrence of the heat generation.

If the heat generation temperature in the display device 201 is lower than the third threshold temperature, the display device 201 may identify a frame rate (e.g., a current frame rate) provided in the display device 201 in operation 1321, and change the frame rate in operation 1327. For example, the display device 201 may change the frame rate from 60 bps to 120 bps as an original frame rate. According to an embodiment of the disclosure, a measurement cycle for monitoring a heat generation temperature may be adjustable, and there may be a case where the heat generation temperature is temporarily low at the measurement cycle, so it may be determined whether a state in which the heat generation temperature is lower than the third threshold temperature is maintained during predetermined time. For example, if the state in which the heat generation temperature is lower than the third threshold temperature is maintained during pre-designated time, or if the number of times the heat generation temperature is lower than the third threshold temperature is more than a pre-designated number, the display device 201 may consider that the heat generation situation is released.

In operation 1329, the display device 201 may transmit, to the electronic device 101, information about a communication cycle which corresponds to the changed frame rate. In response to transmitting the information about the communication cycle, the display device 201 may receive a response from the electronic device 101 in operation 1331. In response to the response, the display device 201 may receive a data frame based on the communication cycle which corresponds to the changed frame rate in operation 1333.

According to an embodiment of the disclosure, the display device 201 may control the heat generation situation in stages. For example, the display device 201 may control the heat generation situation in stages by, for example, changing the frame rate from 120 bps to 60 bps when heat generation occurs, checking the heat generation temperature again, and changing the frame rate from 60 bps to 30 bps if the heat generation temperature is higher than the third threshold temperature.

According to an embodiment of the disclosure, if a temperature less than the third threshold temperature is maintained during a measurement cycle for monitoring whether the heat generation occurs after the frame rate is changed from 120 bps to 60 bps, the display device 210 may maintain the frame rate of 60 bps, or may change the frame rate from 60 bps to 120 bps as an original frame rate.

According to an embodiment of the disclosure, the display device 201 may periodically monitor whether heat generation occurs while being connected to the electronic device 101. For example, in a case that a connection with the electronic device 101 is not released or the transmission of the data frame is not terminated, the display device 201 may continuously monitor whether the heat generation occurs and whether the heat generation situation is released. Accordingly, in a state in which the heat generation situation is released, the display device 201 may perform an operation of changing the frame rate to an original frame rate (e.g., a frame rate before the heat generation).

As described above, according to various embodiments of the disclosure, when the heat generation situation occurs in the electronic device 101 or the display device 201, the frame rate may be adjusted for controlling the heat generation or the heat generation situation may be notified, so damage to the electronic device 101 or the display device 201 due to the heat generation may be prevented.

According to various embodiments of the disclosure, an electronic device (e.g., an electronic device 101) may include a communication circuit (e.g., a communication module 190), and at least one processor (e.g., a processor 120) operatively connected to the communication circuit (e.g., the communication module 190), wherein the at least one processor (e.g., the processor 120) is configured to: establish, via the communication circuit (e.g., the communication module 190), a communication connection with a display device (e.g., a display device 201), identify channel information about a first channel on which the communication connection is established, identify image information about an image displayed in the display device (e.g., the display device 201), and based on the channel information about the first channel and the image information, identify whether the electronic device (e.g., the electronic device 101) is capable of transmitting a data frame each communication cycle which corresponds to a frame rate provided in the display device (e.g., the display device 201).

According to various embodiments of the disclosure, the channel information about the first channel may include a network bandwidth of the first channel and channel utilization of the first channel, and the image information may include data amount per frame and the frame rate provided in the display device (e.g., the display device 201).

According to various embodiments of the disclosure, the at least one processor (e.g., the processor 120) may be configured to: identify a service period (SP) of the display device (e.g., the display device 201) based on the network bandwidth and the data amount per frame, and based on whether the communication cycle is longer than a sum of a period which corresponds to the channel utilization of the first channel and the SP, identify whether the electronic device (e.g., the electronic device 101) is capable of transmitting, to the display device (e.g., the display device 201), the data frame during the SP within the communication cycle which corresponds to the frame rate.

According to various embodiments of the disclosure, the at least one processor (e.g., the processor 120) is configured to: upon identifying that the electronic device (e.g., the electronic device 101) is capable of transmitting the data frame to the display device (e.g., the display device 201), transmit the data frame during the SP period within the communication cycle, and upon identifying that the electronic device (e.g., the electronic device 101) is incapable of transmitting the data frame to the display device (e.g., the display device 201), identify whether the electronic device (e.g., the electronic device 101) is capable of changing the communication cycle which corresponds to the frame rate.

According to various embodiments of the disclosure, the at least one processor (e.g., the processor 120) may be configured to: upon identifying that the electronic device is capable of changing the communication cycle which corresponds to the frame rate, change the communication cycle which corresponds to the frame rate, and transmit, to the display device (e.g., the display device 201) via the communication circuit (e.g., the communication module 190), information about a communication cycle which corresponds to the changed frame rate.

According to various embodiments of the disclosure, the at least one processor (e.g., the processor 120) may be configured to transmit, to the display device (e.g., the display device 201), the information about the communication cycle which corresponds to the changed frame rate by using a TWT protocol, and the information about the communication cycle may be a target wake interval field value of the TWT protocol.

According to various embodiments of the disclosure, the at least one processor (e.g., the processor 120) may be configured to: receive, from the display device (e.g., the display device 201) via the communication circuit (e.g., the communication module 190), a TWT request, and transmit, to the display device (e.g., the display device 201) via the communication circuit (e.g., the communication module 190), a TWT response including the information about the communication cycle which corresponds to the changed frame rate.

According to various embodiments of the disclosure, the at least one processor (e.g., the processor 120) may be configured to: upon identifying that the electronic device (e.g., the electronic device 101) is incapable of changing the communication cycle which corresponds to the frame rate, transmit, to the display device (e.g., the display device 201) via the communication circuit (e.g., the communication module 190), information about a second channel by using a communication other than a communication in which communication connection with the display device (e.g., the display device 201) is established.

According to various embodiments of the disclosure, the at least one processor (e.g., the processor 120) may be configured to: establish a communication connection with at least one other display device (e.g., the display device 201) by using the first channel, and identify whether the electronic device (e.g., the electronic device 101) is capable of transmitting, to the display device (e.g., the display device 201), the data frame every communication cycle which corresponds to the frame rate based on a number of the at least one other display device (e.g., the display device 201).

According to various embodiments of the disclosure, the at least one processor (e.g., the processor 120) may be configured to: after the communication connection with the display device, detect a heat generation state in which a temperature is higher than or equal to a threshold temperature, and change the frame rate provided in the display device corresponding to the heat generation state.

According to various embodiments of the disclosure, an operating method of an electronic device (e.g., an electronic device 101) may include establishing a communication connection with a display device (e.g., a display device 201), identifying channel information about a first channel on which the communication connection is established, identifying image information about an image displayed in the display device (e.g., the display device 201), and based on the channel information about the first channel and the image information, identifying whether the electronic device (e.g., the electronic device 101) is capable of transmitting a data frame each communication cycle which corresponds to a frame rate provided in the display device (e.g., the display device 201).

According to various embodiments of the disclosure, the channel information about the first channel may include a network bandwidth of the first channel and channel utilization of the first channel, and the image information may include data amount per frame and the frame rate provided in the display device (e.g., the display device 201).

According to various embodiments of the disclosure, at least part of the operation of identifying whether the electronic device (e.g., the electronic device 101) is capable of transmitting the data frame each communication cycle which corresponds to the frame rate provided in the display device (e.g., the display device 201) may include identifying a service period (SP) of the display device (e.g., the display device 201) based on the network bandwidth and the data amount per frame, and based on whether the communication cycle is longer than a sum of a period which corresponds to the channel utilization of the first channel and the SP, identifying whether the electronic device (e.g., the electronic device 101) is capable of transmitting, to the display device (e.g., the display device 201), the data frame during the SP within the communication cycle which corresponds to the frame rate.

According to various embodiments of the disclosure, the operating method may further include upon identifying that the electronic device (e.g., the electronic device 101) is capable of transmitting the data frame to the display device (e.g., the display device 201), transmit the data frame during the SP period within the communication cycle, and upon identifying that the electronic device (e.g., the electronic device 101) is incapable of transmitting the data frame to the display device (e.g., the display device 201), identify whether the electronic device (e.g., the electronic device 101) is capable of changing the communication cycle which corresponds to the frame rate.

According to various embodiments of the disclosure, the operating method may further include upon identifying that the electronic device (e.g., the electronic device 101) is capable of changing the communication cycle which corresponds to the frame rate, changing the communication cycle which corresponds to the frame rate, and transmitting, to the display device (e.g., the display device 201), information about a communication cycle which corresponds to the changed frame rate.

According to various embodiments of the disclosure, at least part of the operation of transmitting the information about the communication cycle which corresponds to the changed frame rate may include transmitting, to the display device (e.g., the display device 201), the information about the communication cycle which corresponds to the changed frame rate by using a TWT protocol, and the information about the communication cycle may be a target wake interval field value of the TWT protocol.

According to various embodiments of the disclosure, at least part of the operation of transmitting the information about the communication cycle which corresponds to the changed frame rate may include receiving, from the display device (e.g., the display device 201), a TWT request, and transmitting, to the display device (e.g., the display device 201), a TWT response including the information about the communication cycle which corresponds to the changed frame rate.

According to various embodiments of the disclosure, the operating method may include upon identifying that the electronic device (e.g., the electronic device 101) is incapable of changing the communication cycle which corresponds to the frame rate, transmitting, to the display device (e.g., the display device 201), information about a second channel by using a communication other than a communication in which communication connection with the display device (e.g., the display device 201) is established.

According to various embodiments of the disclosure, the operating method may include establishing a communication connection with at least one other display device (e.g., the display device 201) by using the first channel, and identifying whether the electronic device (e.g., the electronic device 101) is capable of transmitting, to the display device (e.g., the display device 201), the data frame every communication cycle which corresponds to the frame rate based on a number of the at least one other display device (e.g., the display device 201).

According to various embodiments of the disclosure, the operating method may further include, after the communication connection with the display device, detecting a heat generation state in which a temperature is higher than or equal to a threshold temperature, and changing the frame rate provided in the display device corresponding to the heat generation state.

According to various embodiments of the disclosure, a display device (e.g., a display device 201) may include a display, a communication circuit (e.g., a communication circuit 313), and at least one processor (e.g., a processor 311), wherein the at least one processor (e.g., the processor 311) is configured to: transmit, to an electronic device (e.g., an electronic device 101) via the communication circuit (e.g., the communication circuit 313), a target wake time (TWT) request, receive, from the electronic device (e.g., the electronic device 101) via the communication circuit (e.g., the communication circuit 313), a first TWT response, receive a plurality of image frames during each of service periods which are set based on first information included in the first TWT response, and display, on the display, the plurality of image frames at a frame rate which is set based on second information included in the first TWT response.

According to various embodiments of the disclosure, the at least one processor (e.g., the processor 311) may receive, from the electronic device (e.g., the electronic device 101) via the communication circuit (e.g., the communication circuit 313), a second TWT response, and change the set frame rate based on information included in the second TWT response.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit;
   at least one or more processors communicatively coupled to the communication, circuit; and
   memory storing one or more computer programs including computer-executable instructions that, when executed by the one or more processors, cause the electronic device:
      establish, via the communication circuit, a wireless communication connection with a display device,
      identify channel information about a first channel on which the communication connection is established,
      identify image information of the display device for displaying an image, the image information including a first frame rate provided in the display device and an amount of data per frame,
      identify a communication cycle corresponding to a second frame rate for transmitting data frames based on the channel information,
      transmit the data frames to the display device at a transmission frame rate based on the communication cycle and the image information,
      receive, from the display device, information related to a heat generation state of the display device wirelessly connected to the electronic device, the heat generation state indicating that a temperature of the display device is higher than or equal to a threshold temperature, and
      in response to receiving the information related to the heat generation state, reduce the transmission frame rate, and transmit the data frame-frames to the display device based on a communication cycle corresponding to the reduced transmission frame rate.

2. The electronic device of claim 1,
   wherein, to identify the communication cycle, the one or more computer programs further comprise computer-executable instructions to:
      identify a service period (SP) of the display device based on a network bandwidth and the amount of data per frame,
   wherein to identify the communication cycle, the one or more computer programs further comprise computer-executable instructions to:
      identify whether the communication cycle for transmitting data frames is longer than a sum of a period which corresponds to the channel utilization of the first channel and the SP, and
   wherein the SP comprises a period of time required for the display device to transmit or receive data on the first channel at the first frame rate provided in the display device.

3. The electronic device of claim 2,
   wherein the one or more computer programs further comprise computer-executable instructions to:
      upon identifying that it is the communication cycle for transmitting data frame at the first frame rate provided in the display device, transmit a data frame during the SP within the communication cycle,
      upon identifying that it is not the communication cycle for transmitting data frames at the first_frame rate provided in the display device, identify whether a target wake time (TWT) parameter for transmitting the data frame is reconfigured to increase the transmission frame rate based on the channel information,
      upon identifying that the TWT parameter being reconfigured to increase the transmission frame rate, reconfigure the TWT parameter to increase the transmission frame rate, and
      transmit, to the display device via the communication circuit, the reconfigured TWT parameter, and
   wherein the TWT parameter comprises information about a communication cycle which corresponds to the increased transmission frame rate.

4. The electronic device of claim 3,
   wherein the one or more computer programs further comprise computer-executable instructions to transmit, to the display device, the reconfigured TWT parameter by using a TWT protocol, and
   wherein the information about the communication cycle is a target wake interval field value of the TWT protocol.

5. The electronic device of claim 3, wherein the one or more computer programs further comprise computer-executable instructions to:
   receive, from the display device via the communication circuit, a TWT request, and
   transmit, to the display device via the communication circuit, a TWT response including the information about the communication cycle which corresponds to the increased transmission frame rate.

6. The electronic device of claim 3, wherein the one or more computer programs further comprise computer-executable instructions to:
   upon identifying that the TWT parameter not being reconfigured to increase the transmission frame rate, transmit, to the display device via the communication circuit, information about a second channel by using a communication other than a communication in which the wireless communication connection with the display device is established.

7. The electronic device of claim 1, wherein the one or more computer programs further comprise computer-executable instructions to:
establish another wireless communication connection with at least one other display device by using the first channel, and
identify the communication cycle for transmitting data frames at the first frame rate provided in the display device based on a number of display devices of the at least one other display device.

8. A method performed by an electronic device, the method comprising:
establishing a wireless communication connection with a display device;
identifying channel information about a first channel on which the communication connection is established;
identifying image information of the display device for displaying an image, the image information including a first frame rate provided in the display device and an amount of data per frame;
identifying a communication cycle corresponding to a second frame rate for transmitting data frames based on the channel information;
transmitting the data frames to the display device at a transmission frame rate based on the communication cycle and the image information;
receiving, from the display device, information related to a heat generation state of the display device wirelessly connected to the electronic device, the heat generation state indicating that a temperature of the display device is higher than or equal to a threshold temperature; and
in response to receiving the information related to the heat generation state, reducing the transmission frame rate, and transmitting the data frames to the display device based on a communication cycle corresponding to the reduced transmission frame rate.

9. The method of claim 8,
wherein the identifying of the communication cycle comprises:
identifying a service period (SP) of the display device based on a network bandwidth and the amount of data per frame,
wherein the identifying of the communication cycle comprises:
identifying whether the communication cycle for transmitting data frames is longer than a sum of a period which corresponds to channel utilization of the first channel and the SP, and
wherein the SP comprises a period of time required for the display device to transmit or receive data on the first channel at the first frame rate provided in the display device.

10. The method of claim 9, further comprising:
upon identifying that it is the communication cycle for transmitting data frame at the first frame rate provided in the display device, transmitting a data frame during the SP within the communication cycle;
upon identifying that it is not the communication cycle for transmitting data frames at the first frame rate provided in the display device, identifying whether a target wake time (TWT) parameter for transmitting the data frame is reconfigured to increase the transmission frame rate based on the channel information;
upon identifying that the TWT parameter being reconfigured to increase the transmission frame rate, reconfigure the TWT parameter to increase the transmission frame rate; and
transmitting, to the display device, the reconfigured TWT parameter,
wherein the TWT parameter comprises information about a communication cycle which corresponds to the increased transmission frame rate by using a TWT protocol.

11. The method of claim 10,
wherein at least part of the transmitting of the reconfigured TWT parameter comprises:
receiving, from the display device, a TWT request; and
transmitting, to the display device, a TWT response including the information about the communication cycle which corresponds to the increased transmission frame rate, and
wherein the information about the communication cycle is a target wake interval field value of the TWT protocol.

12. One or more non-transitory computer-readable storage media storing one or more computer programs including computer-executable instructions that, when executed by one or more processors of an electronic device, cause the electronic device to perform operations, the operations comprising:
establishing a wireless communication connection with a display device;
identifying channel information about a first channel on which the wireless communication connection is established;
identifying image information of the display device for displaying an image, the image information including a first frame rate provided in the display device and an amount of data per frame;
identifying a communication cycle corresponding to a second frame rate for transmitting data frames based on the channel information;
transmitting the data frames to the display device at a transmission frame rate based on the communication cycle and the image information;
receiving, from the display device, information related to a heat generation state of the display device wirelessly connected to the electronic device, the heat generation state indicating that a temperature of the display device is higher than or equal to a threshold temperature; and
in response to receiving the information related to the heat generation state, reducing the transmission frame rate, and transmitting the data frames to the display device based on a communication cycle corresponding to the reduced transmission frame rate.

* * * * *